US012615672B2

(12) United States Patent
Velev et al.

(10) Patent No.: US 12,615,672 B2
(45) Date of Patent: Apr. 28, 2026

(54) MONITORING AN ATTRIBUTE OF A NETWORK SLICE

(71) Applicant: Lenovo (Singapore) Pte. Ltd., New Tech Park (SG)

(72) Inventors: Genadi Velev, Darmstadt (DE); Apostolis Salkintzis, Athens (GR); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 341 days.

(21) Appl. No.: 17/790,917

(22) PCT Filed: Jan. 3, 2020

(86) PCT No.: PCT/EP2020/050105
§ 371 (c)(1),
(2) Date: Jul. 5, 2022

(87) PCT Pub. No.: WO2021/136599
PCT Pub. Date: Jul. 8, 2021

(65) Prior Publication Data
US 2023/0036993 A1 Feb. 2, 2023

(51) Int. Cl.
*H04W 76/10* (2018.01)
*H04W 48/18* (2009.01)
*H04W 60/04* (2009.01)

(52) U.S. Cl.
CPC ........... *H04W 76/10* (2018.02); *H04W 48/18* (2013.01); *H04W 60/04* (2013.01)

(58) Field of Classification Search
CPC ..... H04W 76/10; H04W 48/18; H04W 60/04; H04W 84/00; H04W 48/06
See application file for complete search history.

(56) References Cited

U.S. PATENT DOCUMENTS

2018/0199398 A1* 7/2018 Dao ........................ H04W 76/27
2018/0262924 A1* 9/2018 Dao .................... H04W 72/535
(Continued)

OTHER PUBLICATIONS

3GPP, "3rd Generation Partnership Project; Technical Specification Group Services and System Aspects; Architecture enhancements for 5G System (5GS) to support network data analytics services (Release 16)", 3GPP TS 23.288 V16.1.0, Sep. 2019, pp. 1-52.
(Continued)

*Primary Examiner* — Nizam U Ahmed
(74) *Attorney, Agent, or Firm* — Kunzler Needham & Hilton

(57) ABSTRACT
For monitoring a slice attribute, apparatuses, methods, and systems are disclosed. One apparatus includes a processor-1005 that determines to collect data for a slice attribute of a network slice. Here, the slice attribute is a number of UEs using the network slice and/or a number of data sessions using the network slice. The processor requests a first collecting network function to report first usage data (e.g., roaming UE usage) for the network slice according to the slice attribute and requests a second collecting network function to report second usage data (e.g., non-roaming usage) for the network slice according to the slice attribute. The processor determines whether a quota associated with the slice attribute is reached. The apparatus includes a transceiver that sends a notification to a network function in response to the quota being met.

10 Claims, 18 Drawing Sheets

(56) References Cited

U.S. PATENT DOCUMENTS

| 2019/0174449 | A1* | 6/2019 | Shan | ..................... | H04W 60/04 |
| 2020/0288350 | A1* | 9/2020 | Yamada | .................. | H04W 4/24 |
| 2021/0160730 | A1* | 5/2021 | Fiorani | ............ | H04W 28/0263 |

OTHER PUBLICATIONS

PCT/EP2020/050105, "Notification of Transmittal of the International Search Report and the Written Opinion of the International Searching Authority, or the Declaration", Oct. 8, 2020, pp. 1-17.

3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, pp. 1-558.

NTT Docomo, AT&T, "Solution to Key Issue #1 on support of network slice related quota on the maximum number of UEs", SA WG2 Meeting #136 S2-1912737, Nov. 18-22, 2019, pp. 1-6.

NTT Docomo, "Solution to Key Issue #2 on support of network slice related quota on the maximum number of PDU Sessions", 2SA WG2 Meeting #136 S2-1911240, Nov. 18-22, 2019, pp. 1-6.

NEC, "Solution KI#1: Max number of UEs per Network Slice control at registration", SA WG2 Meeting #136 82-1911348, Nov. 18-22, 2019, pp. 1-3.

3GPP, "3rd Generation Partnership Project; Technical Specification Group Services and System Aspects; Study on Enablers for Network Automation for 5G—phase 2 (Release 17)", 3GPP TR 23.700-91 V0.2.0, Dec. 2019, pp. 1-19.

* cited by examiner

100

MONITORING AN ATTRIBUTE OF A NETWORK SLICE

The subject matter disclosed herein relates generally to wireless communications and more particularly relates to monitoring a slice attribute of a network slice.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Point Name ("APN"), Access Stratum ("AS"), Application Programing Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAT"), Next Generation (e.g., 5G) Node-B ("gNB"), Next Generation Radio Access Network ("NG-RAN"), New Radio ("NR"), Operations, Administration and Maintenance ("OAM"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Tracking Area Identifier ("TAT"), Transmission Control Protocol ("TCP"), Transmit ("Tx"), Unified Data Management ("UDM"), User Entity/ Equipment (Mobile Terminal) ("UE"), Uplink ("UL"), User Plane ("UP"), Universal Mobile Telecommunications System ("UMTS"), User Datagram Protocol ("UDP"), Wireless Local Area Network ("WLAN"), and Worldwide Interoperability for Microwave Access ("WiMAX").

In certain mobile communication networks, a network slice customer can negotiate (or request) slice characteristics (or attributes) from the network operator deploying the network slice. Possible network slice attributes are described in the GSMA 5GJA working group in the document GSMA 5GJA NG.116 "Generic Network Slice Template". The Generic Network Slice Template (GST) is used by the network operator to derive the network slice characteristics.

BRIEF SUMMARY

Methods for monitoring a slice attribute are disclosed. Apparatuses and systems also perform the functions of the methods.

One method of a NWDAF for monitoring a slice attribute includes determining to collect data for a slice attribute of a network slice. Here, the slice attribute is a number of user equipment devices using the network slice and/or a number of data sessions using the network slice. The method includes requesting a first collecting network function to report first usage data for the network slice according to the slice attribute and requesting a second collecting network function to report second usage data for the network slice according to the slice attribute. Here, the first usage data indicates a number of roaming user equipment devices using the network slice and/or a number of data sessions of roaming user equipment devices using the network slice, while the second usage data indicates a number of non-roaming user equipment devices using the network slice and/or a number of data sessions of non-roaming user equipment devices using the network slice. The method includes determining whether a quota associated with the slice attribute is reached using the first usage data and second usage data and notifying a network function in response to the quota being met, wherein the network function performs an enforcement action.

One method of a UDM for monitoring a slice attribute includes receiving a configuration for monitoring a slice attribute of a network slice. Here, the slice attribute comprising a number of user equipment devices using the network slice and/or a number of data sessions using the network slice. The method includes determining usage data for roaming user equipment devices using the network slice according to the slice attribute. Here, the usage data comprising a number of roaming user equipment devices using the network slice and/or a number of data sessions of roaming user equipment devices using the network slice. The method includes reporting the usage data for roaming user equipment devices using the network slice to a NWDAF.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
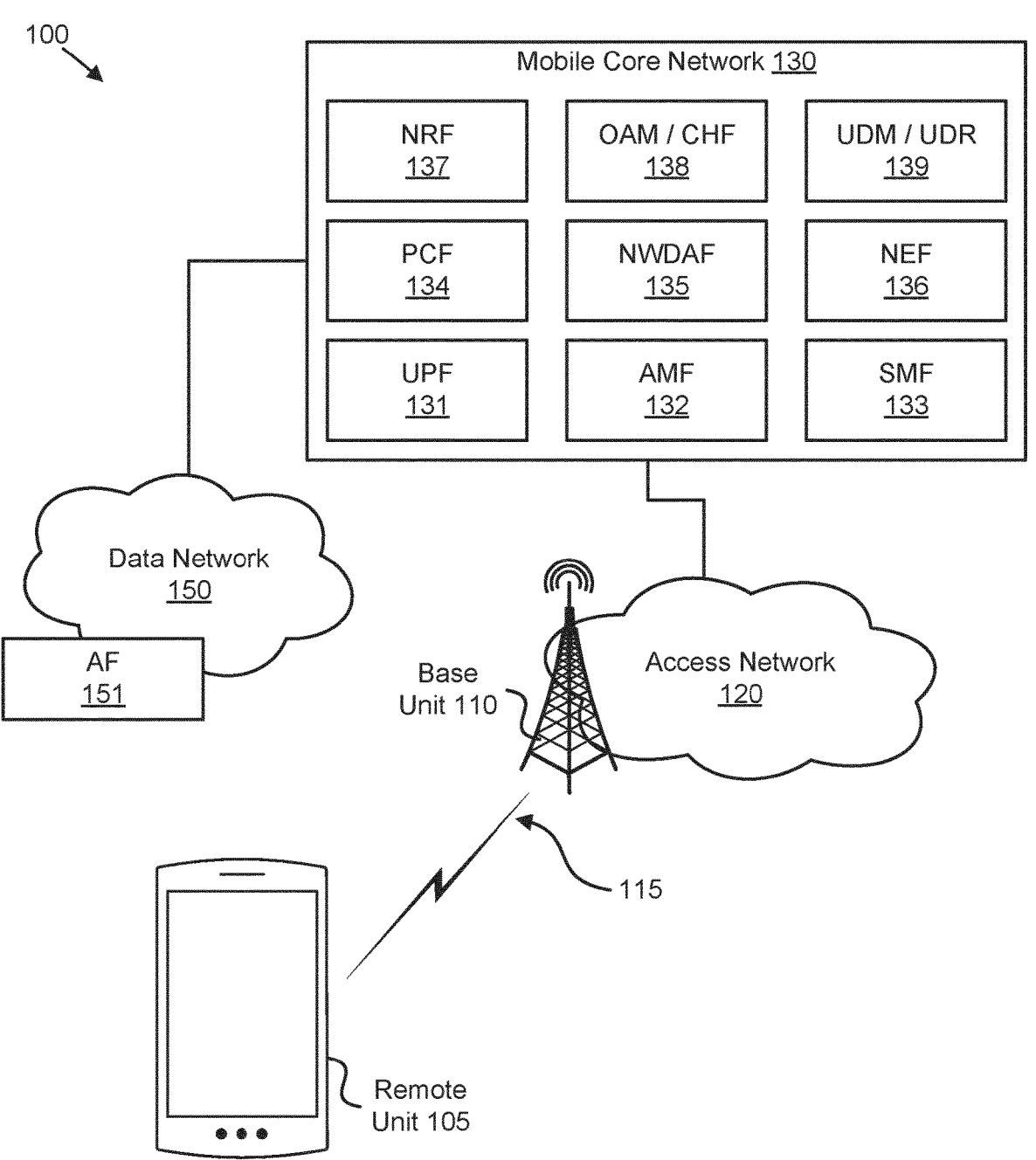
FIG. 1 is a diagram illustrating one embodiment of a wireless communication system for monitoring a slice attribute.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for monitoring a slice attribute, for example monitoring a number of user (e.g., UEs) using the network slice and/or monitoring a number of data connections (e.g., PDU sessions) using the network slice. A mobile communication network may deploy a Network Data Analytics Function ("NWDAF") that derives analytics based on information collected by other NFs. The NWDAF is used for data collection and data analytics in centralized manner and may be used for analytics for one or more Network Slice deployments.

As discussed above, a network slice customer can negotiate (or request) slice characteristics (or attributes) from the network operator (e.g., 5GS) deploying the network slice. However, it is not yet defined how to monitor the current global number of UE or PDU Sessions using a particular network slice. Here, "global" means considering all UEs using the network slice whereas the UEs can be registered in the H-PLMN and in any V-PLMN where the network slice services are offered. Additionally, it is not yet defined how to enforce different actions when the quota of maximum number of UE or PDU Sessions per network slice is reached.

One attribute in the GST is the "number of terminals," an attribute that describes the maximum number of terminals that can use the network slice simultaneously. This is an important input to scale the network slice and provides enough resources to the network slice. It is assumed that the GST "number of UEs per Network Slice" maps to the number of UEs registered to a S-NSSAI, i.e., the "Network Slice" from the GST template maps to S-NSSAI used in the 3GPP specifications.

Another attribute in the GST is the "number of connections," an attribute that describes the maximum number of concurrent sessions supported by the network slice. This too is an important input to scale the network slice and provides enough resources to the network slice. It is a significant difference if the network slice is used to serve 10 users or 1,000,000 users simultaneously. It is assumed that the number of "connections" from the GST template can be mapped to PDU Sessions as known from the 3GPP specifications.

It is assumed that there may be one or multiple UDMs serving the UEs in a PLMN and more specifically the UEs subscribed for a network slice. This is possible in case of network operators deploying several UDM instances (e.g., organized in UDM sets) to serve the subscribers in order to allow for load sharing. For example, a range of subscriber IDs (called SUPIs) may be served by one UDM and another range of subscriber IDs can be served by another UDM.

To remedy the above, the present disclosure describes a NWDAF that collects information/data about at least one quota for a network slice (e.g., number of UEs using the network slice or number of PDU Sessions established towards a network slice, etc.). The "number of UEs" is meant to be the 3GPP network slice attribute mapping to the "number of terminals" GST attribute. The "number of PDU Sessions" is meant to the 3GPP network slice attribute mapping to the GST attribute "number of connections". In this document the notation "number of [UEs or PDU Sessions]" (alternatively, [UE or PDU Session]) is used to show that one or the other or both parameters UEs and PDU Sessions are meant. Based on the collected data, the NWDAF provides analytics related to the monitoring network slice attributes based on the Generic Network Slice Template (GST). The NWDAF can collect data either (1) from the serving UDMs, or (2) from the serving AMFs (serving the network slice) in the HPLMN and from the UDMs for the roaming UEs, or (3) from NSSF for both roaming and non-roaming UEs.

It is also assumed that the AMF can collect information for both network slice attributes 1) number of UEs per S-NSSAI and 2) number of PDU Sessions per S-NSSAI. In various embodiments, the AMF can internally collect information about the number of UEs registered per S-NSSAI, e.g., S-NSSAIx, by processing the UEs' mobility management contexts and looking for S-NSSAIx to be part of the Allowed NSSAI. In various embodiments, the AMF can internally collect information about the number of PDU Sessions per S-NSSAI, e.g., 5-NSSAIx, by processing the UEs' context in the AMF and looking for the established PDU Sessions towards the S-NSSAIx. The AMF usually stores in the "PDU Session level context" per established PDU Session the S-NSSAI(s) associated to the PDU Session. If a UE has multiple PDU Sessions towards the S-NSSAIx, then the AMF would count all PDU Sessions.

The information about 1) number of UEs per S-NSSAI and 2) number of PDU Sessions per S-NSSAI is collected in the HPLMN, i.e., the PLMN contracting the network slice customer. This information is collected globally for all UEs subscribed to the network slice, e.g., mapping to S-NSSAIx, in case that UEs are roaming to any visited PLMN.

The quota of maximum number of UEs or number of PDU Sessions using the network slice can be maintained in the business support systems (BSS) in the network operator. The BSS system usually contains the data of the service-level agreements with the network operator's customers. The quota of maximum number of UEs or number of PDU Sessions can be also maintained in the operations support systems (OSS). Both BSS and OSS can dispose these parameters to the operations, administration, and management (OAM), which can configure the corresponding network functions (NFs) part of the network slice.

FIG. 1 depicts a wireless communication system 100 for monitoring a slice attribute, according to embodiments of the disclosure. In one embodiment, the wireless communication system 100 includes at least one remote unit 105, at least one base unit 110, at least one access network ("AN") 120, and a mobile core network 130 in a PLMN. The AN 120 may be composed of at least one base unit 110. The remote unit 105 may communicate with the access network 120 using 3GPP communication links and/or non-3GPP communication links, according to a radio access technology deployed by the AN 120. Even though a specific number of remote units 105, base units 110, ANs 120, and mobile core networks 130 are depicted in FIG. 1, one of skill in the art will recognize that any number of remote units 105, base units 110, ANs 120, and mobile core networks 130 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the access network 120 via uplink ("UL") and downlink ("DL") communication signals. Furthermore, the UL and DL communication signals may be carried over the communication links 115. Note, that the access network 120 is an intermediate network that provide the remote units 105 with access to the mobile core network 130.

In some embodiments, the remote units 105 communicate with an application function ("AF") 151 (or other communication peer) via a network connection with the mobile core network 130. For example, an application in a remote unit 105 (e.g., web browser, media client, telephone/VoIP application) may trigger the remote unit 105 to establish a PDU session (or other data connection) with the mobile core network 130 using the access network 120. The mobile core network 130 then relays traffic between the remote unit 105 and the AF 151 (e.g., in the data network 150) using the PDU session. Note that the remote unit 105 may establish one or more PDU sessions (or other data connections) with the mobile core network 130. As such, the remote unit 105 may have at least one PDU session for communicating with the data network 150. The remote unit 105 may establish additional PDU sessions for communicating with other data networks and/or other communication peers.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of radio access network are not illustrated but are well known generally by those having ordinary skill in the art. The base units 110 connect to the mobile core network 130 via the access network 120.

The base units 110 may serve a number of remote units 105 within a serving area, for example, a cell or a cell sector, via a communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or an evolved packet core ("EPC"), which may be coupled to a data network (e.g., the data network 150, such as the Internet and private data networks, among other data networks). A remote unit 105 may have a subscription or other account with the mobile core network 130. The present disclosure is not intended to be limited to the implementation of any particular wireless communication system architecture or protocol.

The mobile core network 130 includes several network functions ("NFs"). As depicted, the mobile core network 130 includes at least one user plane function ("UPF") 131 that serves the access network 120. The mobile core network 130 also includes multiple control plane functions including, but not limited to, an Access and Mobility Management Function ("AMF") 132, a Session Management Function ("SMF") 133, a Policy Control Function ("PCF") 134, a Network Exposure Function ("NEF") 136, a Network Repository Function ("NRF") 137 (used by the various NFs to discover and communicate with each other over APIs), and a Unified Data Management function ("UDM") 139. In certain embodiments, the mobile core network 130 may also include, an Authentication Server Function ("AUSF"), or other NFs defined for the 5GC.

The mobile core network 140 also includes a NWDAF 135, and an OAM/CHF function 138. The NWDAF 135 acts as the central data storage that collects from the Network Functions the data required to derive analytics. The OAM/CHF 138 represents OAM and/or charging functions. The network function in the 5GS which gathers the charging information is referred to as the Charging Function ("CHF"). Here, the CHF is aware about the quotas of [UEs or PDU sessions] for which different charging tariffs are applied. The CHF is able to be configured with various quotas for number of [UEs, or PDU Sessions] for S-NSSAIx. The CHF is able to request data analytics regarding the quotas for number of [UEs, or PDU Sessions] for S-NSSAIx. The CHF can enforce different charging policies depending on the exceeding of the various quotas for number of [UEs, or PDU Sessions] for S-NSSAIx. While the OAM/CHF are depicted as a combined element, in other embodiments the OAM and CHF may be implemented separately.

In various embodiments, the mobile core network 130 support different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM 139. In another example, each network slice includes an AMF, an SMF and a UPF. Although specific numbers and types of network functions are depicted in FIG. 1, one of skill in the art will recognize that any number and type of network functions may be included in the mobile core network 130.

A network slice (represented by S-NSSAIx) is configured for monitoring of quota of number of remote units 105 (e.g., UEs) or number of PDU Sessions using the network slice. This configuration can be maintained in the UDM/UDR 139 (and it may be configured by the network operator, e.g., using the OAM/CHF 138); in the AMF 132 (similar like in UDM/UDR 139 can be configured via OAM 138); and/or may be requested by an AF 151 via NEF 136.

Figure 2:
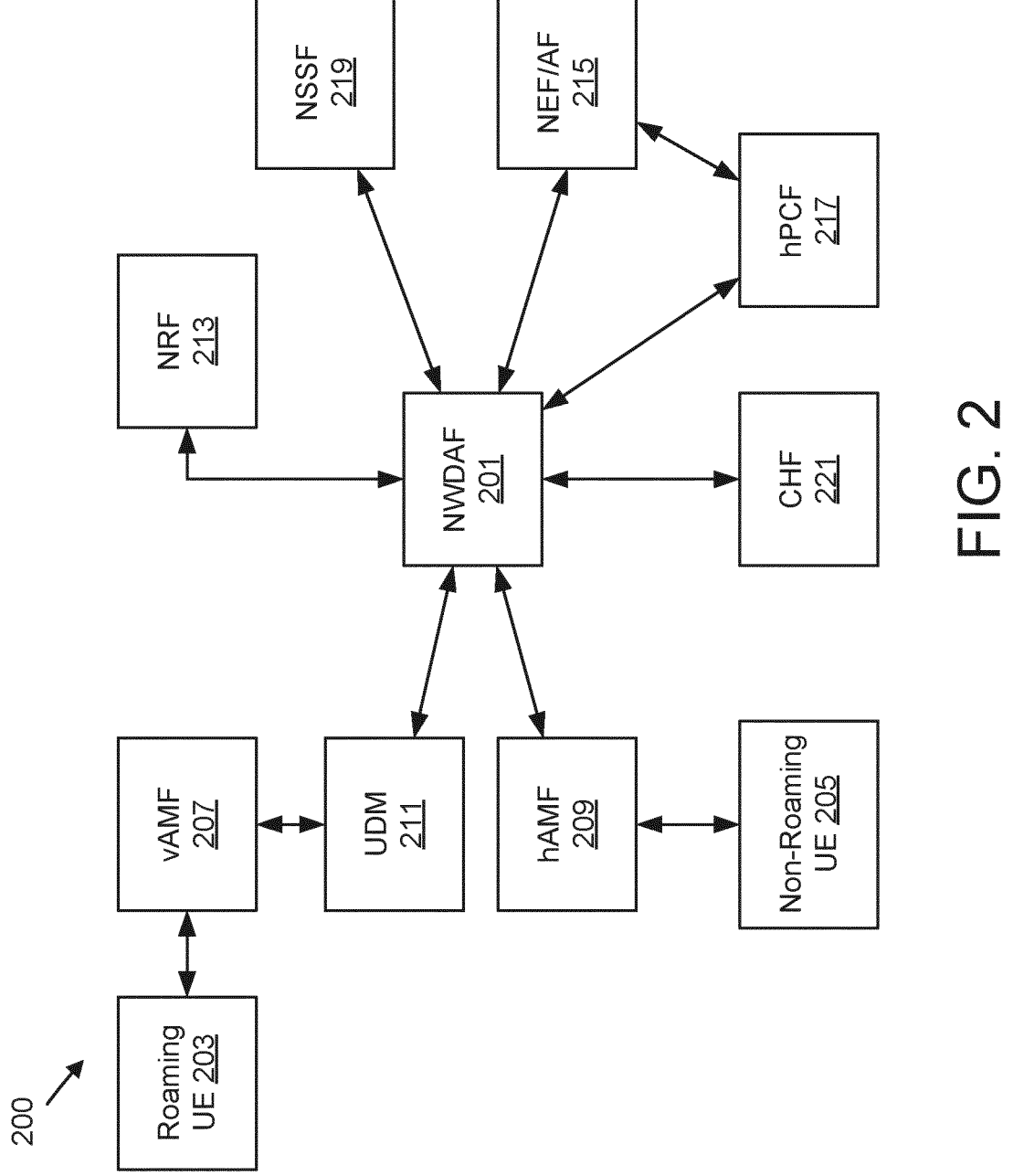
FIG. 2 is a diagram illustrating one embodiment of a network deployment for monitoring a slice attribute.

FIG. 2 depicts a network deployment 200 for monitoring a slice attribute, according to embodiments of the disclosure. The network deployment 200 includes a NWDAF 201 and various nodes it may use to collect and/or report data. The NWDAF 201 is one embodiment of the NWDAF 135. In various embodiments, the NWDAF 201 receives data regarding both roaming UEs 203 and non-roaming UEs 205. Accordingly, the NWDAF 201 may request all AMFs in the home PLMN (referred to as "hAMF(s)" 209) to report data about a particular network slice attribute (e.g., number of non-roaming UEs 205 using the network slice and/or number of PDU sessions of non-roaming UEs using the network slice). Via the UDM 211 the NWDAF 201 may receive data from an AMF in a visited PLMN (referred to as "vAMF(s) 207) for a roaming UE 203 whose subscription data contains the particular network slice. The NWDAF 201 may also establish connections with an NRF 213, NEF/AF 215, PCF in the home PLMN ("hPCF") 217, CHF 221 and/or a NSSF 219 to collect data, report analytics, trigger enforcement actions, and/or report data, as described in further detail below.

In some embodiments, the UDM 211 may request from NWDAF data analytics for network slice attributes (e.g., number of UEs or PDU Sessions for S-NSSAIx), whereas certain UE quota (e.g., quota-U) is included in the request. In some embodiments, the UDM 211 requests the AMFs (e.g., vAMFs 207 in the V-PLMNs) to report the current number of [UEs or PDU Sessions] using the S-NSSAIx. Upon reception of data analytics from NWDAF (e.g., quota reached), the UDM 211 notifies the AMFs (e.g., vAMFs) about the action to perform (e.g., do not allow new [UEs or PDU Sessions] to use the S-NSSAIx). In certain embodiments, UDM 211 monitors the global usage of the quota of the number of [UEs or PDU Sessions] for an S-NSSAI.

Here, the UDM 211 monitors internally the global usage of the quota of the number of [UEs or PDU Sessions] for a network slice (i.e., S-NSSAI) if the network operator configures a single UDM 211 to serve all subscribers of a S-NSSAI.

In some embodiments, the NWDAF 201 is able to provide data analytics whether at least one quota of maximum number of [UEs or PDU Sessions] for an S-NSSAI (S-NSSAIx) is reached. In various embodiments, the NWDAF 201 collects data from the serving AMFs in the H-PLMN to report about the number of [UEs or PDU Sessions] in the HPLMN and collects data from the serving UDMs to report about the number of [UEs or PDU Sessions] in the VPLMN. Upon at least one analytics event is triggered (e.g., at least one quota-A/U/F is reached), the NWDAF notifies the corresponding NF, as described in greater detail below.

In some embodiments, the NSSF 219 is able to report data for analytics to NWDAF. The NSSF can collect information from the AMFs about the UEs currently using a S-NSSAIx or about the currently established PDU Sessions towards a S-NSSAIx.

In some embodiments, the CHF 221 can request the NWDAF 201 to provide data analytics about one or more network slice attribute(s). For example, the data analytics means to monitor whether a certain quota of a network slice attribute(s) is reached. The CHF 221 can be configured with the quotas of the network slice attribute(s) via the OAM or other means.

In some embodiments, the PCF 217 (e.g., a PCF for the home PLMN "hPCF") can request the NWDAF 201 to provide data analytics about one or more network slice attribute(s). For example, the data analytics means to monitor whether a certain quota of a network slice attribute(s) is reached. The PCF 217 can be configured via the OAM or other means with the 1) quotas of the network slice attribute(s) and 2) required actions to perform upon reaching of the quotas. Please note that having the PCF 217 configured with enforcement actions to perform upon reaching of the quotas is an alternative to the embodiment described in FIG. 5B (e.g., at step 10) where the action ID is sent from the AF/NEF. The network operator may be able to configure by its own the actions to be taken upon exceeding of a quota, and thus, the network operator does not rely on actions indicated by the applications (e.g., AF). In such cases, the network operator configures the NFs (here, the hPCF) with one or more quota(s) of network slice attributes and the corresponding actions to be taken upon exceeding of the quota(s). For example, the actions enforced by the hPCF for the particular network slice can be (1) to change the PCC rules to be applied to already established PDU Sessions (e.g., reducing/decreasing QoS parameter(s) in order to allow to serve new PDU Sessions) or (2) the hPCF may enforce the rejection of new [UEs, PDU Sessions].

Figure 3A:
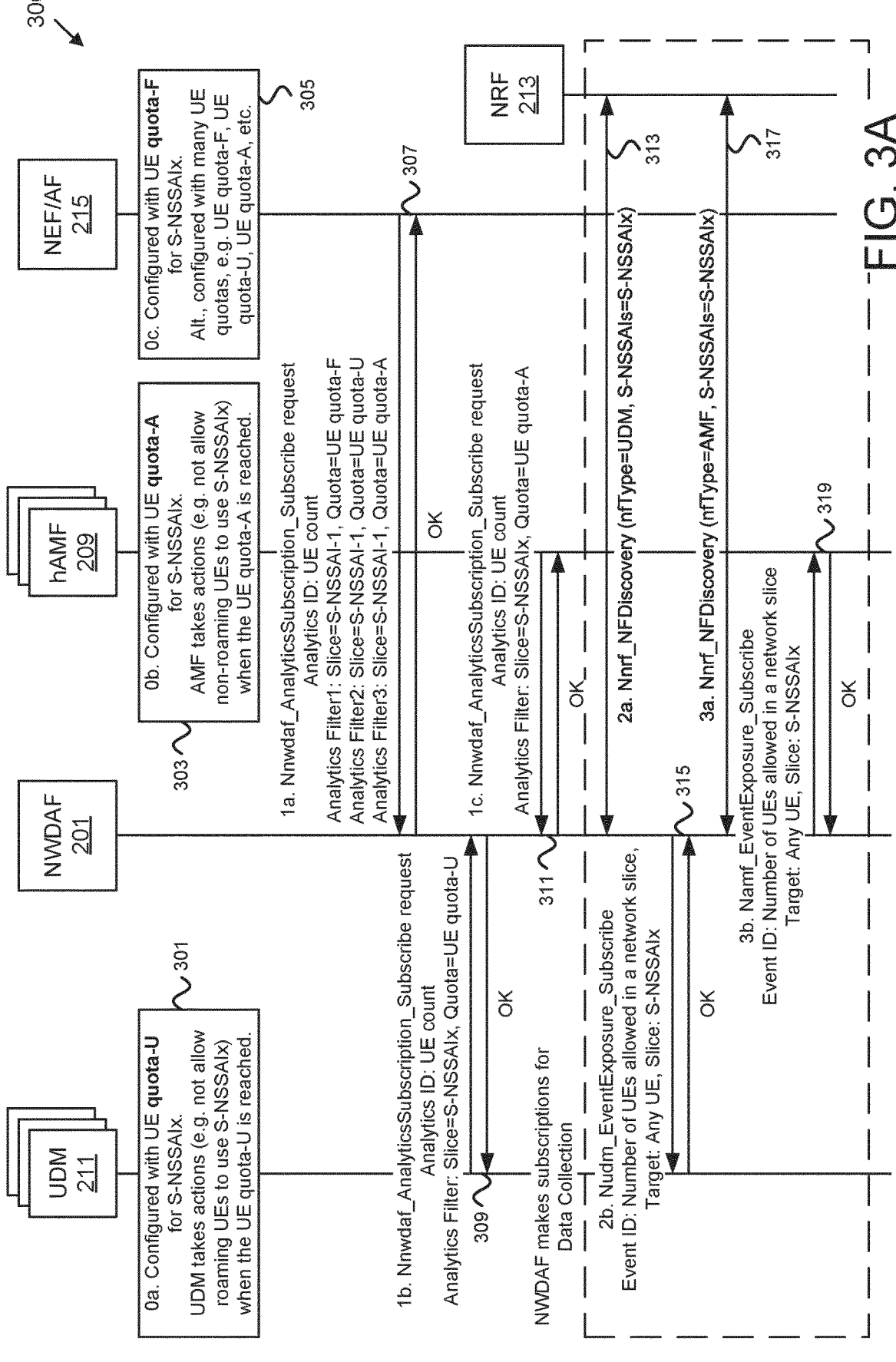
FIG. 3A is a signal flow diagram illustrating one embodiment of a procedure for collecting global data about network slice attributes.
Figure 3B:
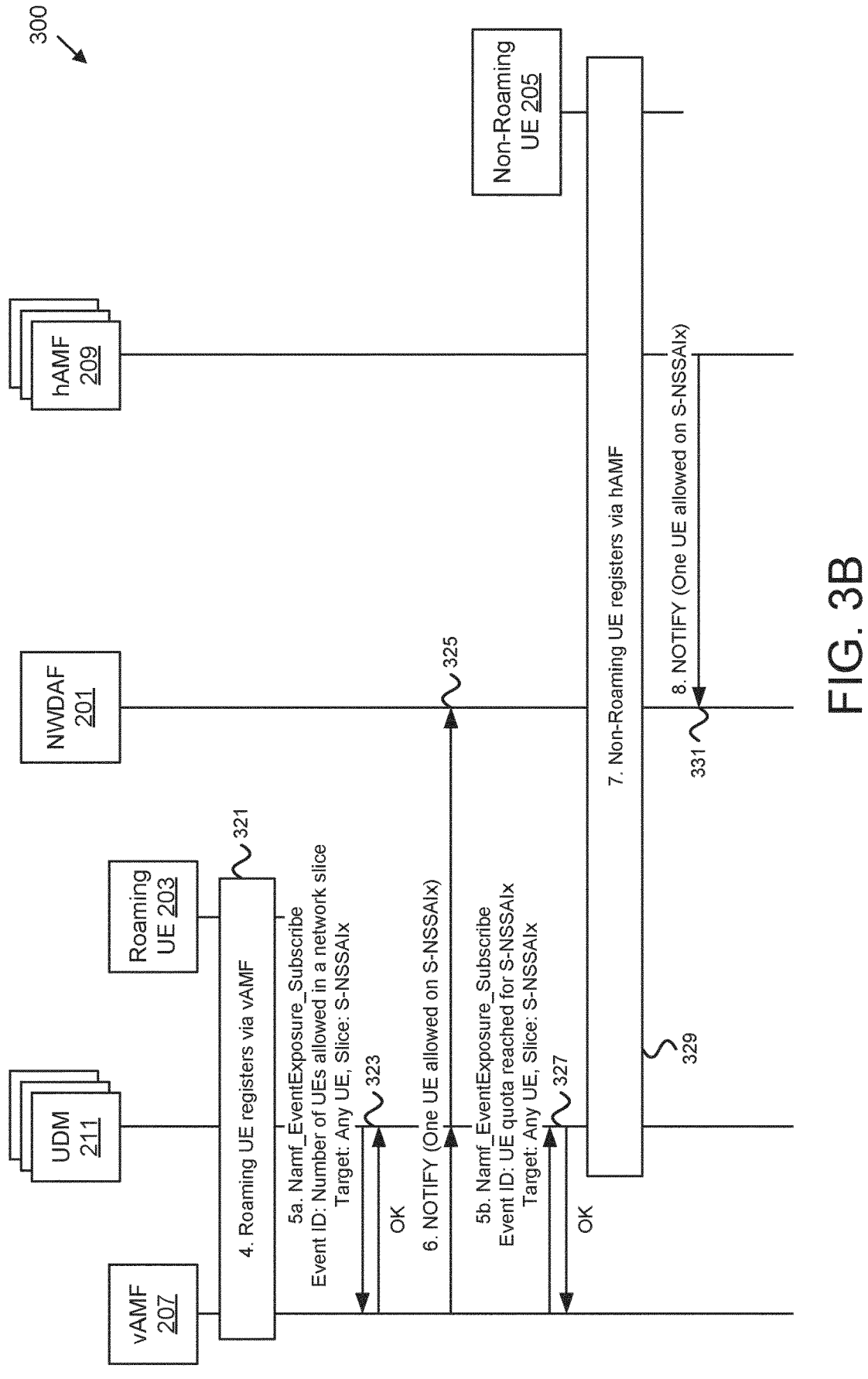
FIG. 3B is a continuation of the procedure depicted in FIG. 3A.
Figure 3C:
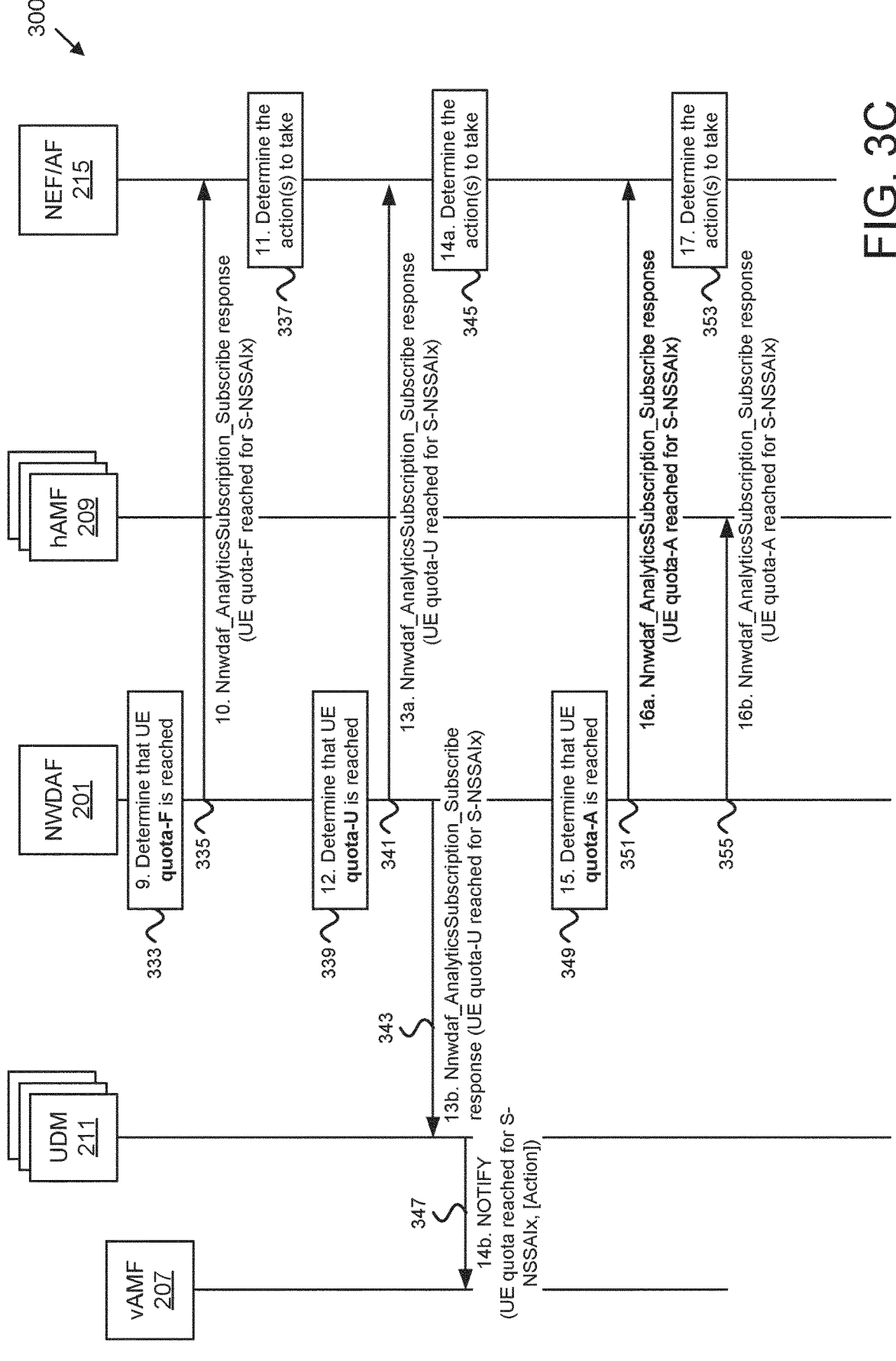
FIG. 3C is a continuation of the procedure depicted in FIGS. 3A-3B.

FIGS. 3A-3C depict a procedure 300 for collecting global data about network slice attributes, according to embodiments of the disclosure. The procedure 300 involves the NWDAF 201, one or more UDMs 211, one or more hAMFs 209, the NRF 213, the NEF/AF 215, a vAMF 207, a roaming UE 203, and a non-roaming UE 205. Note that the NEF/AF 215 element represents an AF (e.g., the AF 151) and a NEF (e.g., NEF 136). The AF acts as the source or sink of the signaling and the NEF relays and maps (or translates) such signaling from/to AF to 5GC internal service requests. For example, the NEF can map identities and parameters from/to AF to another identities and parameters to 5GC network functions (NFs).

One principle is that the global information about number of UEs or number of PDU Sessions using the S-NSSAIx is collected in the NWDAF 201. The serving UDMs 211 collect information/data for the roaming UEs 203 and the serving AMFs in the H-PLMN (hAMFs 209) collect information for the non-roaming UEs 205. The serving UDMs 211 and serving hAMFs 209 report the gathered information to the NWDAF 201.

The procedure 300 begins at step 0 as the serving UDMs 211, serving hAMFs 209, and NEF/AF 215 are configured for monitoring of quota of number of UEs and/or number of PDU Sessions using the network slice. Here, the different NFs are configured with different quotas. At step 0a the UDMs 211 are configured with the quota 'UE quota-U' for S-NSSAIx (see block 301). In certain embodiments, the UDMs 211 are also configured with an enforcement action (e.g., not allow roaming UEs 203 to use S-NSSAIx) to perform when the UE quota-U is met. At step 0b the hAMFs 209 are configured with the quota 'UE quota-A' for S-NS-SAIx (see block 303). In certain embodiments, the hAMFs 209 are also configured with an enforcement action (e.g., not allow non-roaming UEs 205 to use S-NSSAIx) to implement when the UE quota-A is met. At step 0c the NEF/AF 215 is configured with the quota 'UE quota-F' for S-NSSAIx (see block 305). Optionally, the NEF/AF 215 may be configured with multiple quotas, e.g., the UE quota-U, UE quota-A, and UE quota-F.

At step 1a, the NEF/AF 215 may request NWDAF 201 to provide data analytics related to the S-NSSAIx (see messaging 307). The NEF/AF 215 selects and discovers an NWDAF 201, which is capable of collecting data analytics for the network slice attributes as per GST parameters (e.g., the quota of UEs or PDU Sessions using the S-NSSAIx). The NWDAF 201 may acknowledge to NEF/AF 215 the successful subscription for the data analytics. At step 1b, the UDM 211 may request NWDAF 201 to provide data analytics for network slice attribute(s) related to the S-NSSAIx (see messaging 309). The UDM 211 selects and discovers the NWDAF 201, which is capable of collecting data analytics for the network slice attributes as per GST parameters (e.g., the quota of UEs or PDU Sessions using the S-NSSAIx). The NWDAF 201 may acknowledge to UDM 211 the successful subscription for the data analytics. At step 1c, the hAMF 209 may request NWDAF 201 to provide data analytics related to the S-NSSAIx (see messaging 311). The hAMF 209 selects and discovers the NWDAF 201, which is capable of collecting data analytics for the network slice attributes as per GST parameters (e.g., the quota of UEs or PDU Sessions using the S-NSSAIx). The NWDAF 201 may acknowledge to hAMF 209 the successful subscription for the data analytics.

If there are multiple instances of an NWDAF in the PLMN, the network operator assures that all UDMs, AMFs or NEFs select the same NWDAF instance capable of the corresponding analytics, e.g., by requesting the NRF 213 or via a configuration considering the capability of the NWDAF 201 to collect S-NSSAI-relevant quotas. If the NWDAF discovery is via NRF 213, the requesting NF (e.g., UDMs, AMFs, NEFs, PCF, CHF, etc.) can use a new parameter in the request to NRF 213, whereas the new parameter indicates at least one of (1) feature ID to be supported by the NWDAF (e.g., the feature ID meaning gathering data analytics for GST parameters) or (2) particular network slice attribute for data analytics (e.g., quota of UEs or PDU Sessions). The NRF 213 is able to process such new parameter and able to discover certain NWDAF instance which is capable of serving for the specific data analytics.

There can be multiple different quotas (i.e., thresholds or limits) configured in the NFs (or requested by the AF) for the number of UEs or PDU Sessions using the S-NSSAIx: e.g., quota-F when different charging rules may apply, quota-U when the UDM may start to reject new roaming UEs to use the S-NSSAIx, quota-A when the AMF may start to reject new roaming UEs to use the S-NSSAIx. Each quota may be associated with an action, e.g., upon notification than quota-A is reached, the AMFs will not allow new UEs to register with the S-NSSAIx.

In steps 1a, 1b or 1c, the source NFs (e.g., NEF/AF 215, UDM 21 or hAMF 209) request the NWDAF 201 to perform data analytics for number of [UEs or PDU Sessions] using a network slice identified by S-NSSAIx. Please note that a NF (e.g., AF) can request multiple different quotas to be analyzed as shown with the example of "Analytics Filter #". For example, including multiple Analytics Filter # can indicate multiple quotas of [UEs or PDU Sessions] to be counted. Alternatively, the NF (e.g., AF) can request each quota with an independent signaling, e.g., independent Nnwdaf_AnalyticsSubscription_Subscribe request. Further, an independent Analytics ID can be used for each network slice attribute, e.g., Analytics ID #V for counting of the number of UEs per S-NSSAIx and Analytics ID #W for counting the number of PDU Sessions per S-NSSAIx.

In case of AF requesting the analytics, the AF can use an existing (or new) service operation towards the NEF, e.g., Nnef_EventExposure_Subscribe request (request Analytics ID: UE count, Analytics Filter 1: Slice=S-NSSAIx, Quota=UE quota-F) or Nnef_AnalyticsExposure_Subscribe request (Analytics ID: UE count, Analytics Filter 1: Slice=S-NSSAIx, Quota=UE quota-F). If the AF is not aware about the Analytics IDs and other internal 5GC parameters, the AF can also send Nnef_EventExposure_Subscribe (monitoring number of UE for S-NSSAIx, and threshold=UE quota-F) and the NEF can translate the AF request into a request for data analytics from the NWDAF. The NEF determines based on the received request from AF that the NEF needs to trigger subscription request with NWDAF for analytics. The NEF translates this information into a service operation towards the NWDAF, e.g., Nnwdaf_Analytics Subscription_Subscribe request. The NEF may perform NWDAF discovery and selection using the NRF. Recall that the AF and NEF are depicted in FIGS. 3A-3C as a single element for ease of illustration.

In certain embodiments, the service operation request may include an 'Analytics ID="UE count"' parameter. Here, the Analytics ID uses a new value ("UE count") to indicate that a number of UEs and/or number of PDU sessions using a particular network slice is to be tracked. In certain embodiments, the service operation request may include an 'Analytics Filter: Slice=S-NSSAIx' parameter to indicate the particular network slice (i.e., identified by S-NSSAI) for which the analytics should be collected. In certain embodiments, the service operation request may include a 'Quota=UE quota-A' parameter to indicate the maximum number of UEs and/or PDU sessions which are allowed to use the particular network slice.

At step 2, the NWDAF 201 requests all UDMs 211 serving the S-NSSAIx to report data about the monitored network slice attributes (e.g., the quota of UEs or PDU Sessions using the S-NSSAIx). At step 2a, the NWDAF 201 may use NRF 213 services to discover the UDMs 211 associated with the S-NSSAIx (see messaging 313). At step 2b the NWDAF 201 sends a subscribe request to all discovered UDMs 211 (see messaging 315)

At step 3, the NWDAF 201 requests all AMFs (e.g., hAMFs 209) serving the 5-SSSAIx to report data about the monitored network slice attributes (e.g., the quota of UEs or PDU Sessions using the S-NSSAIx). At step 3a, the NWDAF 201 may use NRF 213 services to discover the hAMFs 209 associated with the S-NSSAIx (see messaging 317). Here, the NWDAF 201 discovers the hAMFs 209 in the PLMN (i.e., HPLMN). At step 3b, the NWDAF 201 subscribes with the discovered hAMFs 209 to report the current number of [UEs or PDU Sessions] (see messaging 319). In the depicted example, the NWDAF 201 can use the service operation Namf_EventExposure_Subscribe (Event ID: number of [UEs, PDU Session] registered with network slice, Target: Any UE, Slice: S-NSSAIx, reporting filter (change by 10, or 10 min.)) to subscribe to the hAMFs 209.

In other embodiments, the NWDAF 201 may be configured to collect data from the NSSF 219. In such case, the NWDAF 210 requests the NSSF 219 (i.e., the appropriate NSSF for S-NSSAIx in the HPLMN) to report the current number of [UEs or PDU Sessions] using the 5-NSSAIx. In the NSSF-based case, the current number is the global number including roaming and non-roaming UEs. The NSSF 219 in the HPLMN (i.e., hNSSF) is configured to gather the information about the global number of [UEs or PDU Sessions] using the S-NSSAIx from a) the hAMFs 209 in the HPLMN and b) the NSSFs in the VPLMNs where the UEs using the S-NSSAIx are registered. In order to collect information about the PDU Session currently established towards the S-NSSAIx, the AMFs are modified to report the number of currently established PDU Sessions to S-NSSAIx to the NSSF. For example, a new (or existing) service operation between the hAMF and hNSSF can be used where new parameters for indicating the number of PDU Sessions can be included. Thus, the hNSSF is able to gather the global data and to report to the NWDAF. This alternative is discussed in greater detail with reference to FIG. 6.

Continuing at FIG. 3B, at step 4 a roaming UE 203 registers via vAMF 207 (see block 321. Once a UE (preferably a roaming UE 203 whose subscription data contains the 5-NSSAIx) registers successfully with a AMF (e.g., vAMF 207 in VPLMN), the UDM 211 requests from the AMFs to collect information for certain network slice attributes (e.g., the number of UEs or number of PDU Sessions using the network slice, e.g., by using monitoring event). The UDM 211 can configure a reporting event filter (e.g., report change by 5 or 10; report every 10 minutes, etc.).

Where the roaming UE 203 is the first one at this vAMF 207 to use the slice identified by S-NSSAIx from the HPLMN, the UDM 211 performs step 5a to request the vAMF 207 to report data about current number of [UEs or PDU Sessions] (see messaging 323). The vAMF 207 reports the data to the UDM 211 as shown in step 6 (see messaging 325), and the UDM 211 may decide to report (or to first wait gather more data from other vAMFs 207) the data to NWDAF 201.

The AMFs (vAMF 207 in particular, but optionally hAMFs 209) may request the UDM 211 to be notified when a certain quota (e.g., quota-A) is reached and which action is applied by the AMFs. In step 5b, the vAMF 207 subscribes to (or requests) data analytics for the event corresponding to the event from step 5a, i.e., the vAMF 207 subscribes for data analytics for the quota of [UEs, PDU Sessions] with the UDM 211 (see messaging 327).

At step 7, a non-roaming UE 205 successfully registers with hAMF 209 and the 5-NSSAIx is included in the Allowed NSSAI (see block 329). At step 8, the hAMF 209 may notify the NWDAF 201 about the current number of [UEs, PDU Sessions] using the S-NSSAIx (see messaging 331). For example, the hAMF 209 may use the service operation Namf_EventExposure_Notify including the Event ID, target S-NSSAIx, current Nr of [UEs, PDU Session]) including a parameter 'current Nr of [UEs, PDU Session]' where "Nr" means the current number of all [UEs, PDU Sessions] currently served by the hAMF 209. Note that the hAMF 209 may be configured to immediately report the Event or may be configured to wait an gather more data before reporting, as discussed above.

Continuing at FIG. 3C, the NWDAF 201 collects the data from all UDMs 211 and hAMFs 209 serving the S-NSSAIx and monitors whether the number of simultaneously registered [UEs, PDU Sessions] exceeds any of the configured quotas about the maximum number of [UEs, PDU Sessions] for the S-NSSAIx. The "quota of maximum number of [UEs, PDU Sessions] for the S-NSSAI" as configure as described in step 1a, 1b, or 1c.

At step 9, the NWDAF 201 determines that the UE quota-F is met (see block 333). At Step 10, the NWDAF 201 sends a notification to the NFs subscribed for UE quota-F (see messaging 335). Here, the NWDAF 201 uses the service operation Nnwdaf_Analytics Subscription_Notify (Analytics ID, Correlation ID, S-NSSAIx, [UE, PDU Session] quota-F reached) to notify the NEF/AF 215. Note that the service operation may include at least the following parameters: 1) the S-NSSAI for which the notification is sent, 2) the 'quota exceeded' indicating that the quota/maximum number of [UEs, PDU Sessions] for the S-NSSAIx is exceeded or is about to be exceeded.

At step 11, after the AF is notified that one or more quotas are about to exceed, the AF can determine the actions to be taken in the 5GS based on AF configuration or implementation logic (see block 337). The AF uses the exposed capabilities via interface N33 to request the 5GS to perform the determined actions. For example, the AF can request the 5GS to limit the new [UEs or PDU Sessions] towards the S-NSSAIx.

At step 12, the NWDAF 201 determines that the UE quota-U is met (see block 339). At Step 13, the NWDAF 201 sends a notification to the NFs subscribed for UE quota-U. At step 13a, the NWDAF 201 uses the service operation Nnwdaf_AnalyticsSubscription_Notify (Analytics ID, Correlation ID, S-NSSAIx, [UE, PDU Session] quota-U reached) to notify the NEF/AF 215 (see messaging 341). At step 13b, the NWDAF 201 may use the same service operation to notify the UDM 211 (see messaging 343).

At step 14a, after the AF is notified that one or more quotas are about to exceed (or have already exceeded), the AF can determine the actions to be taken in the 5GS based on AF configuration or implementation logic (see block 345). The AF uses the exposed capabilities via interface N33 to request the 5GS to perform the determined actions. For example, the AF can request the 5GS to limit the new [UEs or PDU Sessions] towards the S-NSSAIx. At step 14b, after the UDM 211 is notified that one or more quotas are about to exceed (or have already exceeded), the UDM 211 signals the subscribed vAMF(s) 207 to indicate that a UE quota for 5-NSSAIx is met and indicates an enforcement action to implement (e.g., reject new roaming UEs to use the S-NSSAIx) (see messaging 347).

At step 15, the NWDAF 201 determines that the UE quota-A is met (see block 349). At Step 16, the NWDAF 201 sends a notification to the NFs subscribed for UE quota-A. At step 16a, the NWDAF 201 uses the service operation Nnwdaf_AnalyticsSubscription_Notify (Analytics ID, Correlation ID, S-NSSAIx, [UE, PDU Session] quota-A reached) to notify the NEF/AF 215 (see messaging 351).

At step 17, after the AF is notified that one or more quotas are about to exceed (or have already exceeded), the AF can determine the actions to be taken in the 5GS based on AF configuration or implementation logic and use the exposed capabilities via interface N33 to request the 5GS to perform the determined actions (see block 301).

At step 16b, the NWDAF 201 may use the same service operation to notify the subscribed hAMFs 209 (see messaging 355). After the hAMF 209 has been notified that the quota of [UE or PDU Sessions] is reached, the hAMF 209 may inform UEs requesting the registration to the S-NSSAIx during Registration procedure or UEs requesting a PDU Sessions establishment procedure about towards the S-NS-SAIx that the S-NSSAIx is not available or the PDU Session establishment is currently not possible. The procedure 300 ends.

While the procedure 300 uses the NWDAF to collect global information about the number of UEs or number of PDU Sessions using the S-NSSAIx, in an alternative implementation the global information may be collected directly in the UDM, especially if the network operator deploys a single UDM serving all subscribers of S-NSSAIx. In this case the NWDAF is not involved.

Figure 4A:
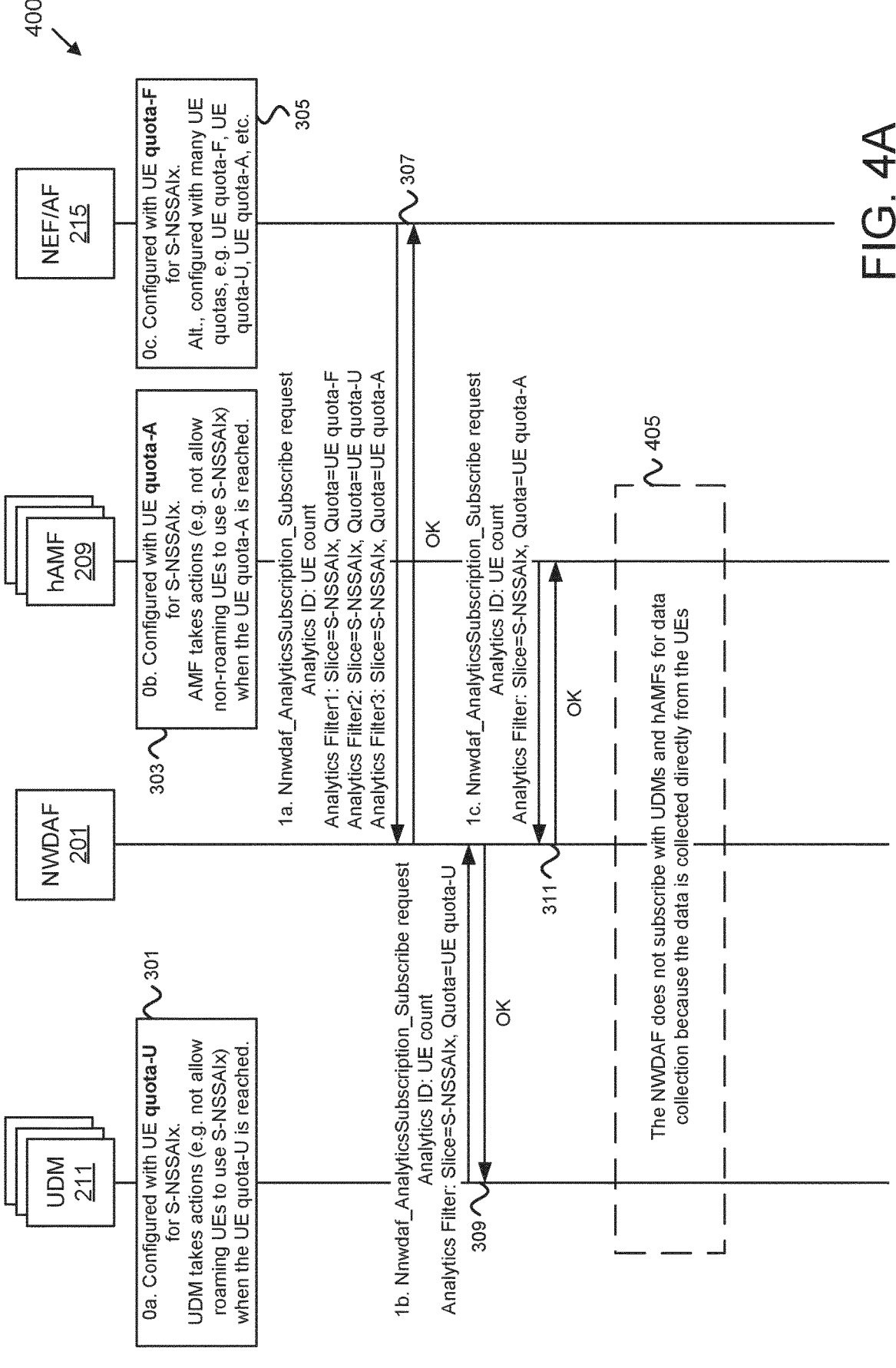
FIG. 4A is a signal flow diagram illustrating one embodiment of a procedure for collecting data from the UE.
Figure 4B:
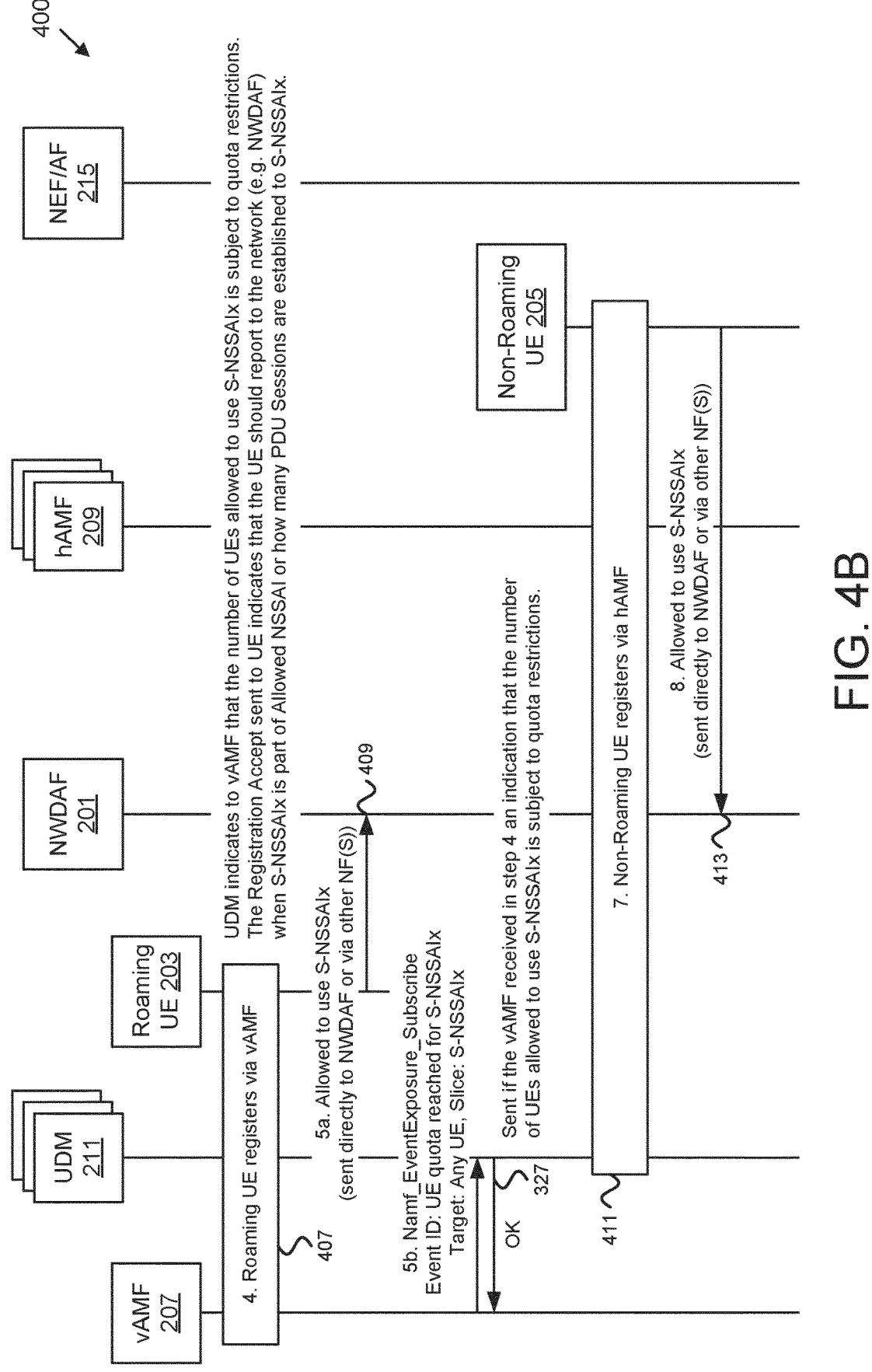
FIG. 4B is a continuation of the procedure depicted in FIG. 4A.

FIGS. 4A-4B depict a procedure 400 for collecting data from the UE, according to embodiments of the disclosure. The procedure 400 involves the NWDAF 201, one or more UDMs 211, one or more hAMFs 209, the NRF 213, the NEF/AF 215, a vAMF 207, a roaming UE 203, and a non-roaming UE 205. The procedure 400 represents an alternative solution to collecting data by the NWDAF where the data is collected from the roaming UEs 203 and non-roaming UEs 205, instead of being collected via the UDMs 211 and hAMFs 209.

The procedure 400 begins at steps 0a, 0b, and 0c with the UDMs 211, hAMFs 209, and NEF/AF 215 being configured with UE quotas for S-NSSAIx, as described above with reference to FIG. 3A (see blocks 301, 303, and 305). At steps 1a, 1b, and 1c, the NEF/AF 215, UDMs 211, and hAMFs 209 subscribe with the NWDAF 201 as described above with reference to FIG. 3B (see messaging 307, 309, and 311).

Note that the NWDAF 201 does not subscribe with UDMs 211 and hAMFs 209 for data collection because the data is collected directly from the roaming UEs 203 and non-roaming UEs 205 (see block 405).

At step 4, a roaming UE 203 successfully registers via the vAMF 207 (see block 407). Here, the UDM 211 indicates to vAMF 207 that the number of [UEs or PDU Sessions] using S-NSSAIx is subject to quota restrictions. In case when the number of UEs is a subject of quota restrictions, the Registration Accept message sent to the roaming UE 203 indicates that the UE should report to the network (e.g., NWDAF 201) when S-NSSAIx is part of Allowed NSSAI or how many PDU Sessions are established to S-NSSAIx. In case that the number of PDU Sessions is a subject of quota restrictions, the vAMF 207 can indicate to the roaming UE 203 either in the Registration Accept message, or in the NAS N1-MM message carrying the N1-SM PDU Session establishment accept message that the UE should report to the network (e.g., NWDAF 201) the number of PDU Sessions established towards the S-NSSAIx. At step 5a, the roaming UE 203 reports to the NWDAF 201 (see messaging 409).

At step 5b, the vAMF 207 subscribes to the UDM 211 as described above with reference to FIG. 3B (see messaging

327). The vAMF 207 subscribes if it receives an indication during the registration of the roaming UE 203 that the number of [UEs or PDU Sessions] using 5-NSSAIx is subject to quota restrictions.

At step 7, a non-roaming UE 205 successfully registers with hAMF 209 and the 5-NSSAIx is included in the Allowed NSSAI (see block 411). In one embodiment, the UDM 211 indicates to hAMF 209 during the registration that the number of [UEs or PDU Sessions] using 5-NSSAIx is subject to quota restrictions. Alternatively, the hAMF 209 may be configured (e.g., by OAM 138 that the number of [UEs or PDU Sessions] using S-NSSAIx is subject to quota restrictions. The hAMF indicates to the UE the need to report to the network (e.g., NWDAF) the number of [UEs or PDU Sessions] using S-NSSAIx. At step 8, the non-roaming UE 205 notifies the NWDAF 201 that S-NSSAIx is part of the Allowed NSSAI and/or reports how may PDU sessions are established to S-NSSAI (see messaging 413).

Note that the procedure 400 continues with steps 9-17 of FIG. 3C (these steps are not shown in FIG. 4B). The procedure 400 ends.

Figure 5A:
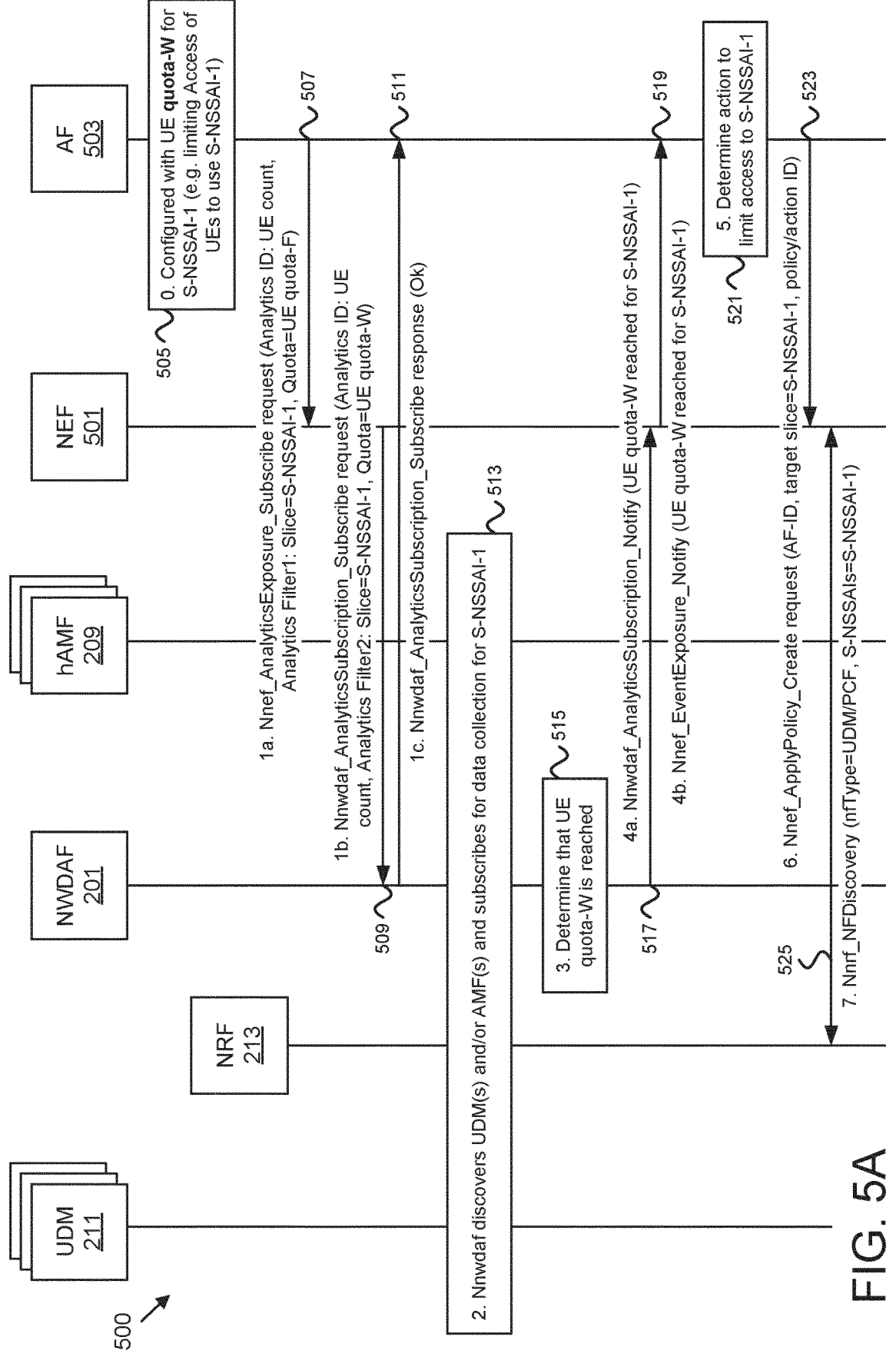
FIG. 5A is a signal flow diagram illustrating one embodiment of a procedure for determining an enforcement action upon reaching an attribute quota.
Figure 5B:
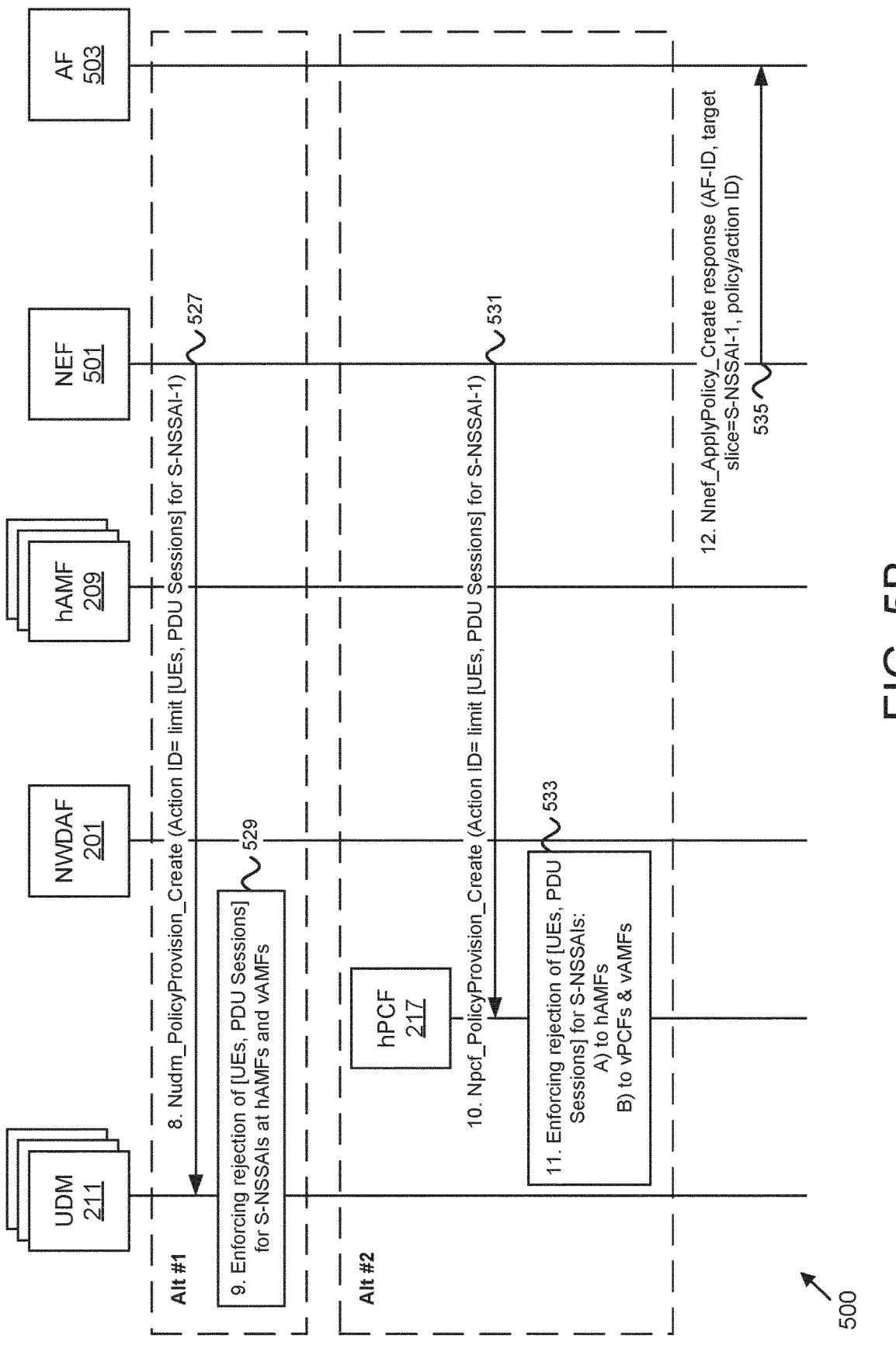
FIG. 5B is a continuation of the procedure depicted in FIG. 5A.
Figure 5C:
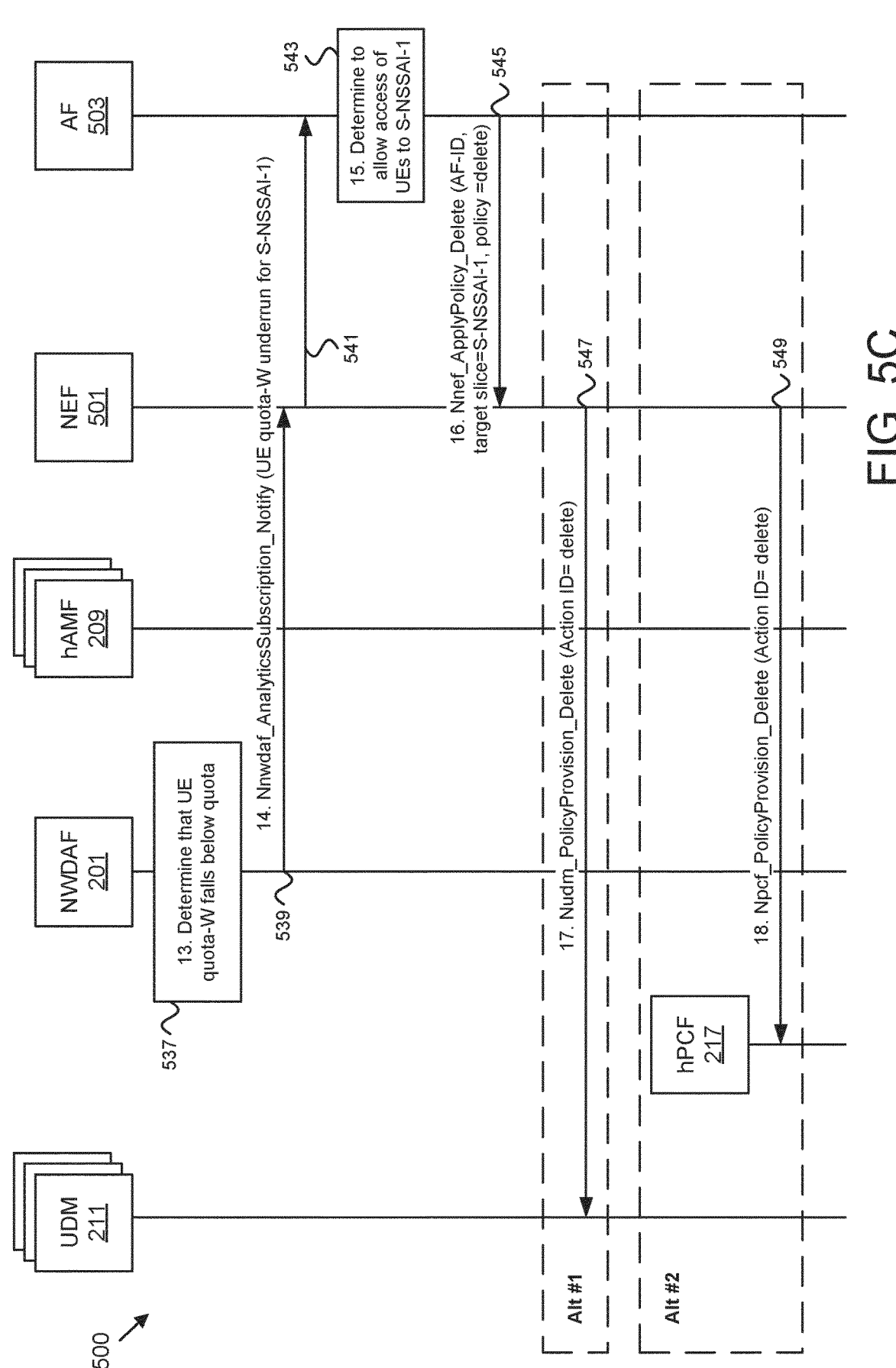
FIG. 5C is a continuation of the procedure depicted in FIGS. 5A-5B.

FIGS. 5A-5C depict a procedure 500 for determining an enforcement action upon reaching a quote associated with a monitored network slice attribute, according to embodiments of the disclosure. The procedure 500 involves the NWDAF 201, one or more UDMs 211, one or more hAMFs 209, the NRF 213, a NEF 501, an AF 503, and the hPCF 217. The procedure 500 shows how the application function (AF) 503 can determine the action to be taken in the network based on data analytics provided by the NWDAF 201, as mentioned above with reference to FIG. 3C. Note that FIGS. 5A-5B depict the NEF/AF element in its separate NEF and AF elements.

The procedure 500 begins at step 0 as the AF 503 is configured with a quota-W of number of [UEs or PDU Sessions] at which the access to network slice identified by S-NSSAI-1 should be limited (see block 505). The network slice identifier "S-NSSAI-1" is assigned by the 5GS network and sent to the AF 503 via SLA or other signaling means not described herewith.

Alternatively, the network (5GS) can also expose the S-NSSAI-1 to the AF 503 and the AF 503 can associate the S-NSSAI-1 with the service.

At step 1a, the AF 503 requests the network to be informed if the event of particular upper number (e.g., quota-W) of [UEs or PDU Sessions] using the network slice S-NSSAI-1 is reached (see messaging 507). This is similar to step 1a from FIG. 3A. The AF 503 can use an existing (or new) service operation towards the NEF 501, e.g., Nnef_EventExposure_Subscribe request (request Analytics ID: UE count, Analytics Filter: Slice=S-NSSAI-1, Quota=UE quota-W).

The NEF 501 may need to interrogate with the NRF 213 to discover the NWDAF 201 which is in charge of performing the analytics for collecting the number of [UEs or PDU Sessions] using a network slice. At step 1b, the NEF 501 sends a request to the NWDAF 201 (see messaging 509). At step 1c, the NWDAF 201 responds to the AF 503 whether the establishment of analytics collection is successful or not (see messaging 511).

At step 2, the NWDAF 201 is configured how to collect the data needed to perform the analytics requested by the AF 503 via NEF 501 (see block 513). This is similar to steps 2a, 2b, 3a, 3b, 6, 8 from FIG. 3A-3B. At step 3, the NWDAF 201 collects the data for the S-NSSAI-1 and monitors whether the number of simultaneously registered [UEs, PDU Sessions] exceeds any of the configured quotas about the maximum number of [UEs, PDU Sessions] for the S-NSSAI-1, e.g., quota-W. At some point the NWDAF 201 determines that the quota is reached (see block 515).

At step 4a, the NWDAF 201 sends Nnwdaf_Analytics-Subscription_Notify (UE quota-W reached for S-NSSAI-1) to the NEF 501 (see messaging 517). At step 4b, the NEF 501 forwards the notification to the AF 503 (see messaging 519). The NEF 501 may translate this service operation into Nnef_EventExposure_Notify (UE quota-W reached for S-NSSAI-1), whereas the exposed parameter may be a new defined parameter. At step 5, the AF 503 determines which action to perform based on configuration (see block 521). For example, the AF 503 may determine that the access of further [UEs or PDU Sessions] towards the S-NSSAI-1 should be limited.

At step 6, the AF 503 sends a request to the NEF 501 to start applying a policy to limit the access to the S-NSSAI-1 (see messaging 523). For example, the AF 503 may use a new service operation Nnef_ApplyPolicy_Create request (AF-ID, target slice=S-NSSAI-1, policy/action ID) where a new "policy/action ID" should be specified with the meaning of limiting access of further [UEs or PDU Sessions] to the network slice identified by S-NSSAI-1. At step 7, the NEF 501 may need to discover the target network functions (NFs) to the which the new policy should be applied (see messaging 525). For this purpose, the NEF 501 may request the NRF 213 to obtain the NF IDs.

Continuing at FIG. 5B, in one alternative (Alt #1), the NEF 501 may be configured to apply to the new policy towards the UDM 211. In this case, at step 8 the NEF 501 sends a request to the UDMs/UDR to apply (or to provision) to policy to limit the access of [UEs or PDU Sessions] to S-NSSAI-1 (see messaging 527). The NEF 501 may use a new service operation (or re-use an existing one, e.g., the Nudm_parameter_provision_update service operation). For example, the NEF 501 may send a new service operation Nudm_PolicyProvision_Create (Action ID=limit [UEs, PDU Sessions] for S-NSSAI-1) in order to create a new policy with "Action ID=limit [UEs, PDU Sessions] for S-NSSAI-1".

At step 9, the UDM 211 enforces the start of rejection of additional [UEs or PDU Sessions] for S-NSSAI-1 at the AMFs in the HPLMN (hAMFs 209) and AMFs in the VPLMNs (vAMFs 207) (see block 529). This can be similar to steps 6b and 19 (for roaming UEs) from Fehler! Verweisquelle konnte nicht gefunden werden. but similar steps can be performed between hAMFs 209 and UDMs 211.

At step 10, in a second alternative (Alt #2), the NEF 501 may be configured to apply to the new policy towards a PCF in the HPLMN (hPCF 217). The NEF 501 may need to discover a hPCF 217 which is responsible for the policy of the S-NSSAI-1. Then, the NEF 501 can send a request to the hPCF 217 to apply (or to provision) to policy to limit the access of [UEs or PDU Sessions] to S-NSSAI-1 (see messaging 531). Again, the NEF 501 may use a new service operation (or re-use an existing one). For example, the NEF 501 may send a new service operation Npcf_PolicyProvision_Create (Action ID=limit [UEs, PDU Sessions] for S-NSSAI-1) where the to new policy identified by "Action ID=limit [UEs, PDU Sessions] for S-NSSAI-1" is sent to the hPCF 217.

At step 11, the hPCF 217 may enforce the rejection of [UEs, PDU Sessions] for S-NSSAI-1 in different ways (see messaging 533). The hPCF 217 is assumed to be the PCF for mobility management and access management (MM&AM) policy. Two options are described herewith: Option A) In the HPLMN, the hPCF 217 is already associated with the hAMFs 209 serving the UEs from the S-NSSAIs. The hPCF 217 sends the new (or updated) MM&AM policy to all hAMFs 209. The hAMFs 209 start to enforce rejection of new [UEs or PDU Sessions] trying to use the S-NSSAI-1. Option B) In any VPLMN, the hPCF 217 would be associated to PCFs in the VPLMNs (i.e., vPCFs) serving the UEs in the VPLMN. The vPCFs can instruct the vAMFs 207 about the request to reject of new [UEs or PDU Sessions] trying to use the S-NSSAI-1 (or the mapped S-NSSAI value in the VPLMN). Alternatively, to enforce the rejection of [UEs, PDU Sessions] for S-NSSAI-1, the hPCF 217 may change the PCC rules to be applied to already established PDU Sessions to S-NSSAI-1. For example, the hPCF 217 may determine to reduce the aggregated maximum bit rate (AMBR) for the PDU Session(s) so that new PDU Session(s) can be accepted and served by the network slice S-NSSAI-1. At step 12, the NEF 501 responds to step 6 (see messaging 535). For example, the NEF 501 acknowledges the successful creation of the new policy in the network.

Continuing at FIG. 5C, at step 13 the NWDAF 201 may determine at any point that the number of [UEs or PDU Sessions] using the S-NSSAI-1 falls under the quota-W (see block 537). At step 14, the NWDAF 201 sends Nnwdaf_A-nalyticsSubscription_Notify (UE quota-W underrun for S-NSSAI-1) to indicate to the NEF 501 that the number of [UEs or PDU Sessions] using the S-NSSAI-1 falls under the quota-W (see messaging 539). The NEF 501 may map this information into the appropriate information towards the AF 503 (see messaging 541).

At step 15, the AF 503 may determine based on the report of lower number of [UEs or PDU Sessions] to stop applying the limitation for the access to the S-NSSAI-1 (see block 543). Accordingly, the AF 503 may also determine to perform application level actions, e.g., to send application layer signaling to the UEs and re-configure the corresponding applications in the UEs. At step 16, the AF 503 sends a request to the NEF 501 to delete the previously created policy in step 6 (see messaging 545). For this purpose, the AF 503 may perform the service operation Nnef_Apply-Policy_Delete (AF-ID, target slice=S-NSSAI-1, policy=delete).

At step 17, in case of alternative 1 (Alt #1), the NEF 501 may send to the UDM 211 a message indicating the deletion of the policy established in step 8 (see messaging 547). For example, the NEF 501 may perform service operation Nudm_PolicyProvision_Delete (Action ID=delete). The UDMs 211 then update the corresponding AMFs (hAMFs 209 and vAMFs 207) so that new [UEs or PDU Sessions] are allowed to access this S-NSSAI-1.

At step 18, in case of alternative 2 (Alt #2), the NEF 501 can send to the hPCF 217 a message indicating the deletion of the policy established in step 10 (see messaging 549). For example, the NEF 501 can perform service operation Npcf_PolicyProvision_Delete (Action ID=delete). The hPCF 217 deletes the indicated policy in all vPCFs. The vPCFs would correspondingly update the vAMFs 207, which allow the access of new [UEs or PDU Sessions] to this S-NSSAI-1. The procedure 500 ends.

Figure 6:
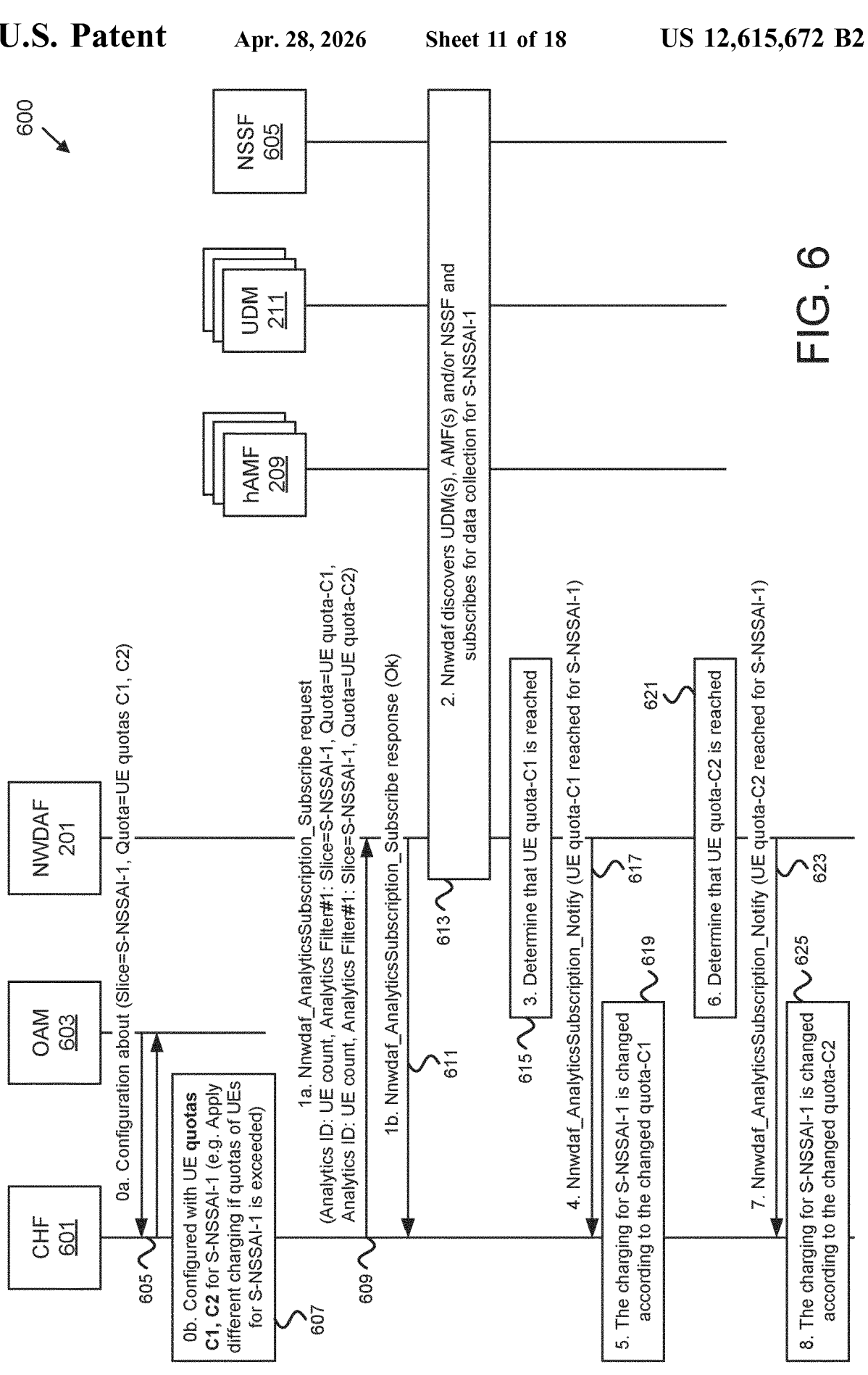
FIG. 6 is a signal flow diagram illustrating one embodiment of a procedure for applying adaptive charging for S-NSSAI depending on the quota of UEs or PDU Sessions.

FIG. 6 depicts a procedure 600 for applying adaptive charging for S-NSSAI depending on the quota of UEs or PDU Sessions, according to embodiments of the disclosure. The procedure 600 involves a CHF 601, an OAM system 603, the NWDAF 201, one or more hAMFs 209, one or more UDMs 211, and a NSSF 605. The CHF 601 may be one implementation of the CHF 221 and/or the OAM/CHF 138, discussed above. The OAM system 603 may be one implementation of the OAM/CHF 138, discussed above. The NSSF 605 may be an implementation of the NSSF 219, discussed above.

The procedure 600 begins at step 0 as the CHF 601 is configured with one or multiple quotas C1, C2 of number of [UEs or PDU Sessions] at which different charging tariffs should be applied for the S-NSSAI-1 if the quotas are exceeded. There are different alternatives how the CHF 601 can be configured.

Step 0a represents a first alternative where the OAM system 603 configures the CHF 601 (statically or dynamically) with the different charging quotas of [UEs or PDU Sessions] (see messaging 605). The charging quotas C1 or C2 can be derived from the SLA negotiated between the network operator and the network slice customer. Step 0b represents the second alternative where the CHF 601 may be configured by other means, e.g., by manually, with [UEs or PDU Sessions] quotas C1, C2 for S-NSSAI-1 (see block 607).

At step 1a, the CHF 601 requests the NWDAF 201 to be informed if at least one quota (e.g., C1 and C2) of number of [UEs or PDU Sessions] using the network slice S-NS-SAI-1 is reached (see messaging 609). This is similar to step 1b or 1c from FIG. 3A. The CHF 601 may use an existing (or new) service operation towards the NWDAF 201. For example, the CHF 601 may send Nnwdaf_AnalyticsSub-scription_Subscribe request (Analytics ID: UE count, Analytics Filter #1: Slice=S-NSSAI-1, Quota=UE quota-C1, Analytics Filter #2: Slice=S-NSSAI-1, Quota=UE quota-C2). The CHF 601 may need to interrogate with the NRF 213 to discover the NWDAF 201 which is in charge of performing the analytics for collecting the number of [UEs or PDU Sessions] using a network slice S-NSSAI-1. At step 1b, the NWDAF 201 responds to the CHF 601 whether the establishment of analytics collection is successful or not (see messaging 611).

At step 2, the NWDAF 201 starts collecting data from the corresponding NFs (see block 613). For example, as described in FIG. 3A, the UDMs 211, hAMFs 209 or NSSF 605 can be requested by the NWDAF 201 to report the data regarding the number of [UEs or PDU Sessions] using a network slice S-NSSAI-1.

At step 3, the NWDAF 201 determines that the quota of [UEs or PDU Sessions] has reached C1 (see block 615). At step 4, the NWDAF 201 notifies the CHF 601 about the reached quota C1 (see messaging 617). For example, the NWDAF 201 may perform the service operation Nnwdaf_AnalyticsSubscription_Notify (UE quota-C1 reached for S-NSSAI-1).

At step 5, the CHF 601 adapts the charging for S-NS-SAI-1 according to the configured charging policy for the quota C1 (see block 619). For example, the upon exceeding the quota C1, the CHF 601 may increase the charging by 50% from the regular charging policy.

At step 6, the NWDAF 201 continues to collect the analytics data and can determine that the quota of [UEs or PDU Sessions] has reached C2 (see block 621). At step 7, the NWDAF 201 notifies the CHF 601 about the reached quota C1 (see messaging 623). For example, the NWDAF 201 can perform the service operation Nnwdaf_Analytics-Subscription_Notify (UE quota-C1 reached for S-NSSAI-1).

At step 8, the CHF 601 adapts the charging for S-NS-SAI-1 according to the configured charging policy for the quota C2 (see block 625). For example, the upon exceeding the quota C2, the CHF 601 may increase the charging by 100% from the regular charging policy. The procedure 600 ends.

Figure 7A:
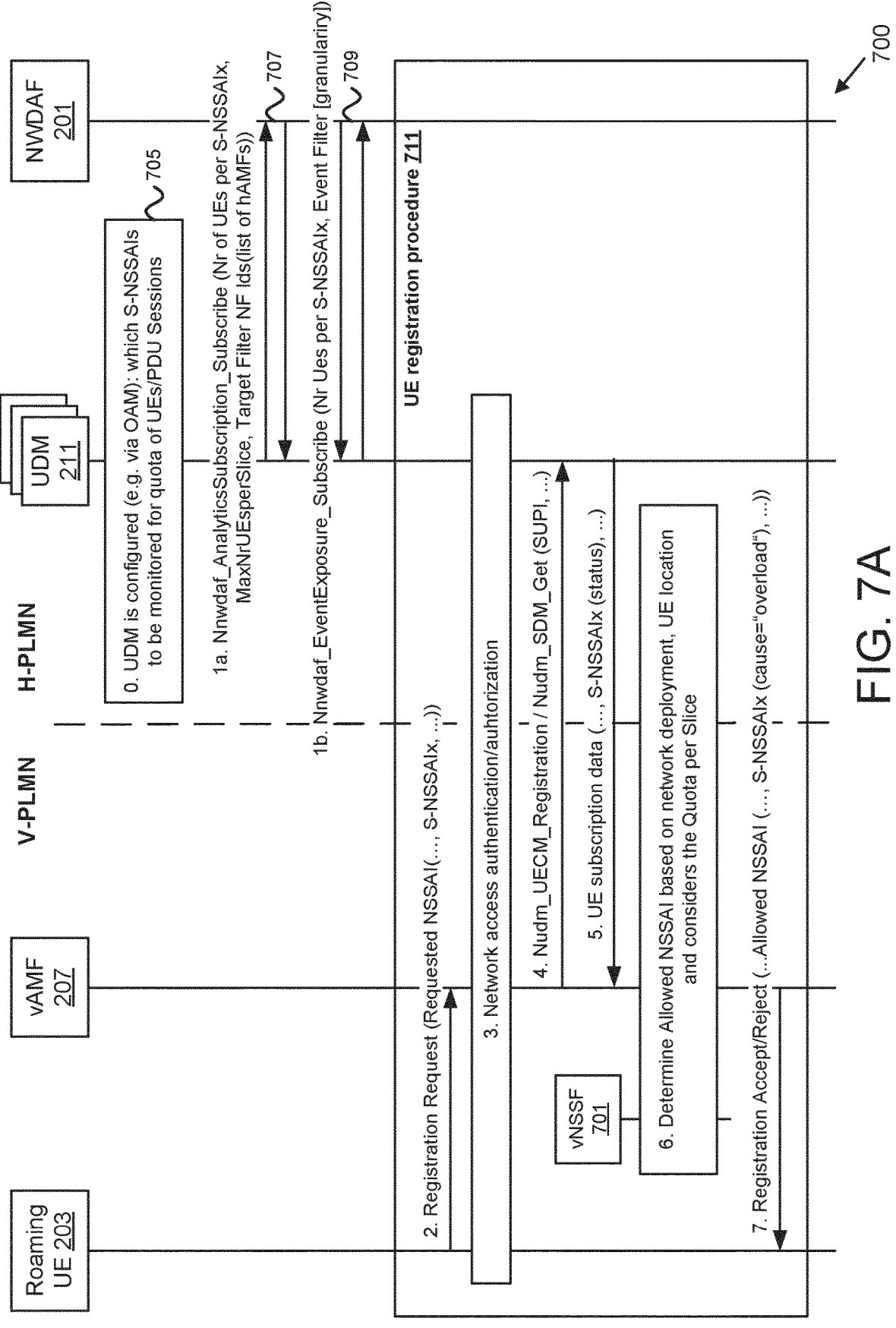
FIG. 7A is a signal flow diagram illustrating one embodiment of a procedure for registration of roaming UE subscribed for a particular S-NSSAI.
Figure 7B:
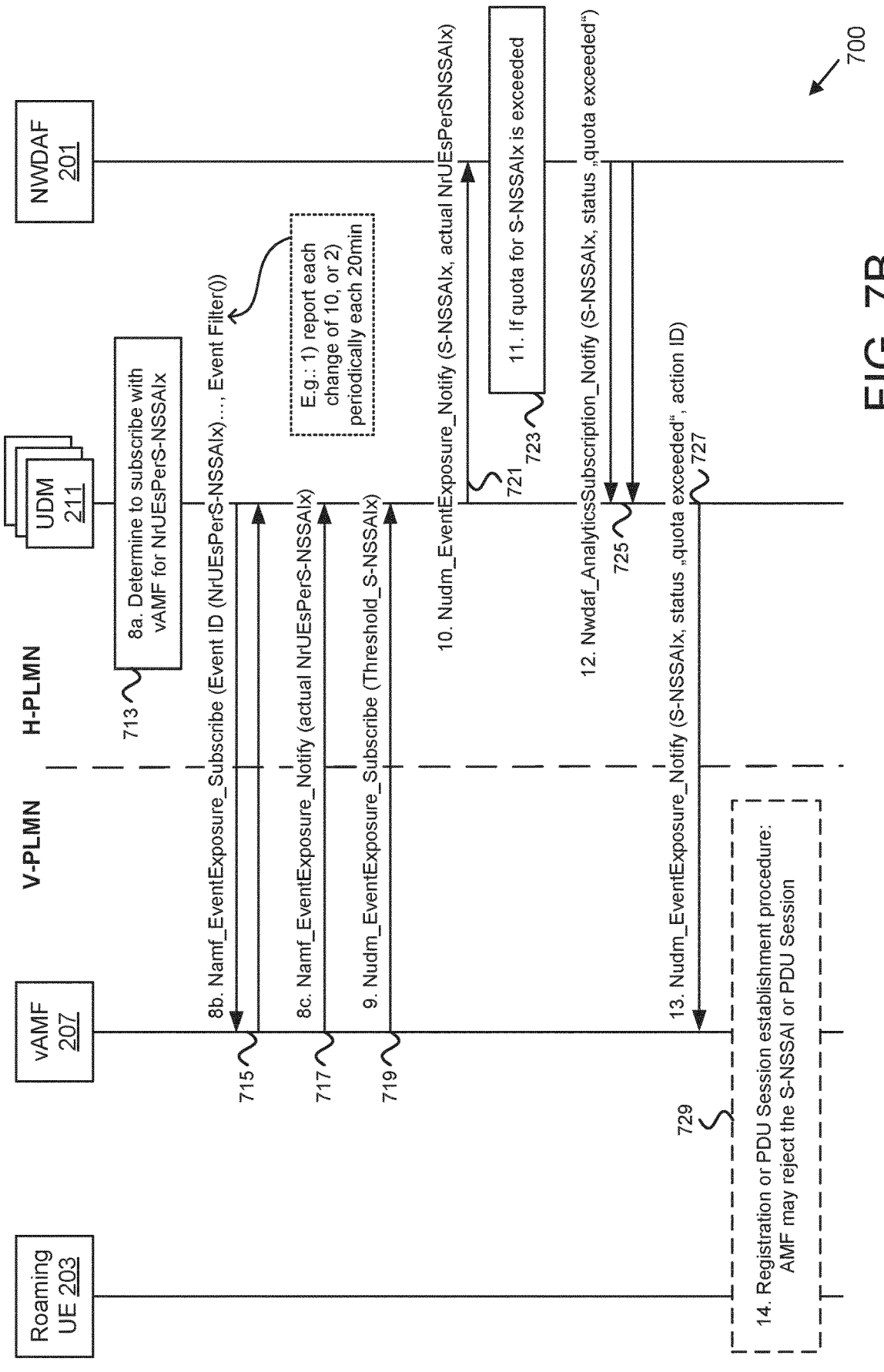
FIG. 7B is a continuation of the procedure depicted in FIG. 3A.

FIGS. 7A-7B depict a procedure 700 for registration of roaming UE subscribed for the particular network slice 'S-NSSAIx,' according to embodiments of the disclosure. The procedure 700 involves a roaming UE 203, a vAMF 207, and a vNSSF 701 in the V-PLMN and also involves one or more UDMs 211 and the NWDAF 201 in the H-PLMN. Please note that the multiple shown UDMs are meant for serving the different UEs. The procedure 700 depicts collecting information about number of UEs or number of PDU sessions using an S-NSSAI (denoted as S-NSSAIx), for which the quota of number of UEs or number of PDU sessions shall be monitored. In one example, this procedure is applicable to a roaming scenario where the UEs using the S-NSSAIx are served by a visited PLMN (V-PLMN). The procedure shows how to monitor/count the number of UEs (or PDU Sessions), which are registered for a network slice, and to enforce actions when the limit of maximum number of UEs is reached. Because the procedure is applicable to monitoring both 1) number of UEs or 2) number of PDU Sessions, in the following it is denoted as number of [UEs or PDU Sessions].

The procedure 700 begins at step 0 as the UDM 211 is configured with the network slices (i.e., S-NSSAIs) for which a quota should be monitored for at least 1) maximum number of UEs concurrently registering for a network slice or 2) maximum number of PDU Sessions concurrently established within a network slice of UEs (see block 705). This is a characteristic of the S-NSSAI. In one example, the Operations, Administration and Management (OAM) system 603 can configure the UDM 211.

In addition, the UDM 211 may be configured with the quota(s) of maximum numbers (e.g., of UEs or PDU Sessions) which are allowed to use the network slice (i.e., with the S-NSSAI). This parameter may be configured based on the Generic Network Slice Template (GST) negotiated during the service-level agreement (SLA) between the network operator and the network slice customer.

At step 1a, the UDM 211 requests analytics from the NWDAF 201 for a specific S-NSSAI (see messaging 707). For this purpose, the UDM 211 subscribes (or at some point the UDM 211 can unsubscribe) with the NWDAF 201 to be notified on analytics information for a particular network slice, e.g., S-NSSAIx.

In various embodiments, the UDM 211 may use the service operation Nnwdaf_Analytics Subscription (Analytics ID(s), Analytics Reporting Parameter(s), Analytics Filter Information, Notification Target Address) including at least the following new parameters: [Analytics ID(s), Quota(s), Target List].

In certain embodiments, subscribe request includes one or more new Analytics ID(s) for collecting quota(s) of parameters for an S-NSSAI. For example, one new Analytics ID can be 1) to collect information about the number of UEs concurrently registering for a network slice or 2) to collect information about the number of PDU Sessions concurrently established within a network slice. In certain embodiments, subscribe request includes the quota(s) of maximum number of [UEs or PDU Sessions] which can be registered with this S-NSSAIs. The maximum number of [UEs or PDU Sessions] can be configured in the UDM 211 based on the GST parameter negotiated with the slice customer. In certain embodiments, subscribe request includes a target list of NFs from which the information can be collected, e.g., a list of AMFs in the HPLMN where UEs subscribed for the network slice are registered. For example, this can be encoded in the Notification Target Address parameter. The NWDAF 201 may acknowledge to UDM 211 the successful subscription for the analytics gathering.

At step 1b, the NWDAF 201 subscribes with the UDM 211 to be notified about the current number of UEs or PDU Sessions using this S-NSSAI (see messaging 709). This step is performed if the data collection is needed in the NWDAF 201 for the data analytics. The NWDAF 201 may include an Even Filter [granularity] parameter which indicates how often the UDM 211 is to report, for example after a predetermined number of changes (e.g., 10 changes) or periodically after a predetermined amount of time (e.g., every 10 minutes). The UDM 211 may acknowledge to NWDAF 201 the successful subscription for the data collection.

At steps 2-7, the UE 203 initiates a Registration procedure (see block 711). In various embodiments, the Registration procedure is similar to the description in 3GPP TS 23.502 (v16.3.0) clause 4.2.2.2, incorporated herein by reference. The UE 203 may include a particular S-NSSAI (e.g., S-NS-SAIx) in the Requested NSSAI informational element (IE). At least one modification to the known registration procedure is in step 5: if the UDM 211 identifies that one or more of the subscribed S-NSSAI for this UE 203 are subject of monitoring the maximum number of UEs simultaneously using the network slice, the UDM 211 sends an appropriate indication to the vAMF 207. For example, the indication has the meaning to the vAMF 207 that for this S-NSSAIx the number of UEs registered to the slice should be counted (or monitored) where the UDM 211 can include a new parameter associated with the S-NSSAI (subject of quota monitoring) indicating the current status on the S-NSSAI.

In certain embodiments, the UDM 211 may include the status "quota reached" for S-NSSAIs for which the quota has been currently reached. This indication helps the vAMF 207 to know that this (subscribed) S-NSSAI is not available currently and should not be included in the Allowed NSSAI sent to the UE 203 in step 7. If the status of the S-NSSAI is "quota reached", then the vAMF 207 is not to use this S-NSSAI in the exchange with the vNSSF 701 to determine the Allowed S-NSSAI containing the S-NSSAIs which can be allowed in the current registration area for this UE 203.

Continuing on FIG. 7B, at step 8a, if this is the first vAMF 207 to which the UE subscription data contains the S-NS-SAIx, then the UDM 211 determines to subscribe with the vAMF 207 to be notified about the current number of UEs or PDU Sessions using this S-NSSAI (see block 713).

In step 8b, the UDM 211 may use for example the service operation Namf_EventExposure_Subscribe (Event ID (NrUEsPerS-NSSAIx) . . . , Event Filter( )), where the Event ID means e.g., the type of quota (UEs or PDU Sessions) to be monitored (see messaging 715). Here, the Event Filter( ) parameter indicates how often to report, for example after a predetermined number of changes (e.g., 10 changes) or periodically after a predetermined amount of time (e.g., every 20 minutes).

In step 8c, the vAMF 207 may report/notify the UDM 211 about the current number of UEs/PDU Sessions using the S-NSSAIx (see messaging 717). If a UE or a group of UEs 1) deregister from a network slice or 2) release PDU Session(s) to a network slice, the vAMF 207 can determine the changes and the vAMF 207 notifies the changed number to the UDM(s) 211. For example, the vAMF 207 may use the service operation Namf_EventExposure_Notify (Event ID ( ), S-NSSAIx, current Nr [UEs, PDU Sessions]).

Step 9, if this is the first UE 203 whose list of subscribed S-NSSAI contain S-NSSAIx and the vAMF 207 has not yet subscribed for the threshold (or "quota reached") for this S-NSSAIx, the vAMF 207 requests the UDM 211 to be notified when the threshold or quota has been reached (see messaging 719). For example, the vAMF 207 may perform the service operation Nudm_EventExposure_Subscribe (Event ID (Threshold_S-NSSAIx)) where the "Threshold_S-NSSAIx" means the threshold/quota for the S-NS-SAIx.

At step 10, if the monitoring of number of UEs registered to the S-NSSAI is performed at the UDM 211, the UDM 211 can internally count the number of UEs registered to the S-NSSAIx (see messaging 721). The UDM 211 sends a notification message to the NWDAF 201 to report the current number of [UEs, PDU Sessions] using the S-NS-SAIx. For example, the UDM 211 can use an existing service operation Nnwdaf_EventExposure_Notify (S-NS-SAIx, actual NrUEsPerS-NSSAIx) including at least the following new parameters: 1) S-NSSAIx indicating which S-NSSAI is targeted for update, 2) actual Nr UEs or PDU Sessions using the S-NSSAIx. Alternatively, the UDM 211 can use a new service operation to indicate increase or decrease of number of UEs to the NWDAF 201.

At step 11, the NWDAF 201 collects the actual number of UEs (or PDU Sessions) from all UDMs 211 and/or hAMFs 209 and monitors whether the quota for the S-NSSAIx is reached (see block 723). If the quota for S-NSSAIx is exceeded (or close to be exceeded), the NWDAF 201 notifies the UDM(s) which has subscribed for the analytics as per step 1a.

At step 12, the NWDAF 201 notifies all subscribed UDM(s) which have subscribed for the analytics as per step 1a (see messaging 725). The notification to multiple UDMs is shown by multiple arrows in the FIG. 7B. For example, the NWDAF 201 can use service operation Nwdaf_Analyt-icsSubscription_Notify (S-NSSAIx, status "quota exceeded") where the parameters status "quota exceeded" means that the quota has been reached.

At step 13, if the quota of maximum [UEs, PDU Sessions] using the S-NSSAIx has been reached, the UDM 211 determines the required actions based on the configuration in the UDMs 211. For example, if the UDMs 211 are configured to limit the access of further [UE or PDU Sessions] if the quota is reached, then the UDM 211 determines to enforce limitation of access to S-NSSAIx. The UDM 211 notifies all vAMFs 207 which has subscribed for notification as per step 10 (see messaging 727). For example, an existing (or a new) service operation can be used Nudm_EventEx-posure_Notify (S-NSSAIx, status "quota exceeded," action ID). Alternatively, the UDM 211 can use a new service operation. The "action ID" indicates to the vAMF 207 what to do with additional (1) UEs attempting to register with S-NSSAIx or (2) UE attempting to establish a PDU Sessions towards the S-NSSAIx.

For example, the "action ID" can indicate at least one of: (1) only 'gold' subscribers can be allowed to successfully use the S-NSSAIx, i.e., to register with S-NSSAIx or to establish PDU Sessions towards S-NSSAIx; for non-gold subscribers, the request for S-NSSAIx registration or PDU Session establishment to S-NSSAIx is rejected with an appropriate cause value; or (2) the requests from all UEs are rejected with an appropriate cause value.

At step 14, the vAMF 207 restricts the use of the S-NSSAIx according to the indication(s) in step 13 (e.g., according to the "action ID" instruction) (see block 729). In case the exceeded quota is for maximum number of UEs per network slice, the vAMF 207 considers the corresponding S-NSSAIx as not available for new UE registrations. The vAMF 207 does not consider the S-NSSAIx when determining the registration area (e.g., TAI list) and the vAMF 207 may include S-NSSAIx in the list of rejected S-NSSAIs with an appropriate reject cause value when including the S-NSSAI in the list of Rejected S-NSSAI.

For example, the rejection cause value can be 'S-NSSAI not available due to reached maximum number of UEs,' or 'S-NSSAI not available due to resource limitation,' of just 'overload'. The UE 203 is not to attempt to use the rejected S-NSSAI unless the Rejected S-NSSAI list is updated in the UE as described below with reference to FIG. 8. If all S-NSSAI(s) in the possible Allowed NSSAI are subject of monitoring the maximum number of UEs simultaneously using the network slice, and the result for all S-NSSAI(s) is 'not-available' (i.e., there are not any other S-NSSAIs which can be included in the Allowed NSSAI), the AMF sends Registration Reject message.

The Registration Reject message may include at least some of the following parameters: 1) a new mobility management (MM) reject cause indicating that the registration is rejected due to no available network slices due to exceeded quota for all requested S-NSSAIs; 2) a list of Rejected S-NSSAIs including all S-NSSAI(s) indicated from the NWDAF/UDM as 'not-available'. The reject cause value for the S-NSSAIs can be similar as described in step 12b); 3) A back-off time during which the UE should not re-attempt a Registration Request with the S-NSSAIs as in the list of Rejected S-NSSAIs. The time value can be generated by the AMF based on network configuration.

In case the exceeded quota is for maximum number of connections per network slice, the vAMF 207 considers the corresponding S-NSSAIx as not available for establishing new PDU Sessions. During a PDU Session establishment procedure, the vAMF 207 may reject the PDU Session with a cause value indicating that the quota for connections to S-NSSAI is exceeded. The UE 203 is not to attempt further PDU Session establishment requests towards this S-NSSAI. The UE 203 should store the PDU Session establishment redetection in the MM context, so that the UE 203 can internally check whether a new PDU Session establishment request targets the 5-NSSAIx. If yes, the UE NAS MM layer should internally reject the PDU Session establishment request to the NAS SM layer. The procedure 700 ends.

The benefit of this solution is that the number of UEs simultaneously registered to the S-NSSAIx is monitored during the registration procedure and the UE can be informed during the registration accept message whether the S-NSSAIx is allowed or rejected.

Figure 8:
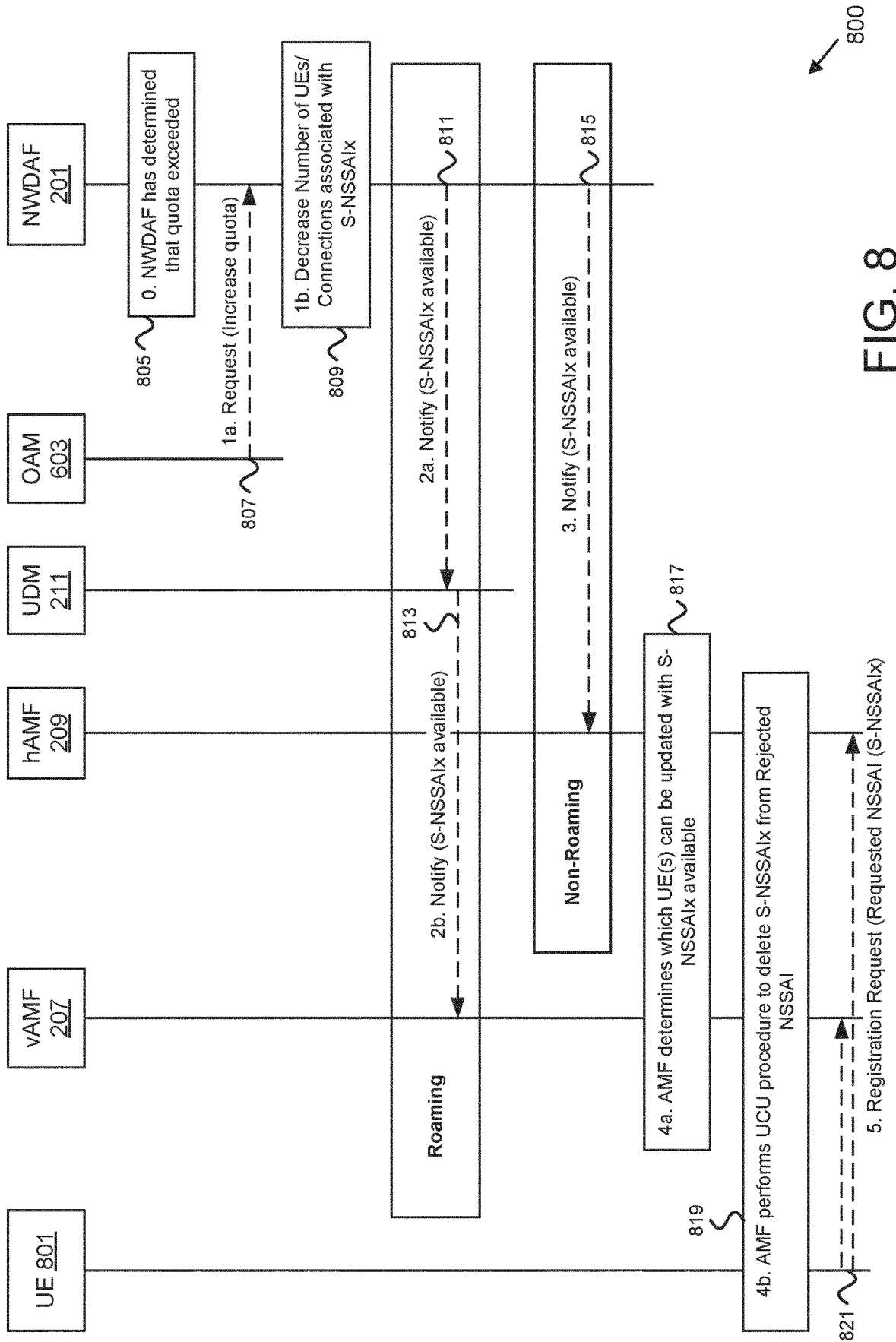
FIG. 8 is a signal flow diagram illustrating one embodiment of a procedure for updating a UE when S-NSSAI is available again.

FIG. 8 depicts a procedure 800 for updating a UE when S-NSSAI is available again, e.g., when the quota for the network slice attribute is underrun, according to embodiments of the disclosure. The procedure 800 involves a UE 801, a vAMF 207, a hAMF 209, the UDM 211, the OAM system 603, and the NWDAF 201. If (1) the maximum number of UEs registered for an S-NSSAI or (2) maximum number of PDU Sessions has been reached, the NF (e.g., UDM or NWDAF, or other NF) responsible for counting the UEs registered for the S-NSSAI can enforce actions to limit further UEs to register to the S-NSSAI. The network can at some point determine that the [UEs, PDU Session] using the S-NSSAI has decreased and the quota is underrun. Then, the network can inform the AMF about the available resources for this S-NSSAI.

The procedure 800 is applicable when the following 2 conditions occur: (1) 5-NSSAIx or a PDU session establishment were already rejected due to exceeded quota of UEs or PDU Sessions and (2) the when S-NSSAI is available again (i.e., the quota of UEs or PDU Sessions using the S-NSSAIx is underrun). The procedure 800 begins at step 0 as the NWDAF 201 has determined that the quota/threshold of (1) maximum number of UEs registered for an S-NSSAI or (2) maximum number of PDU Sessions has been reached and the NWDAF 201 has already notified the UDMs 211 or AMFs 207-209, e.g., as shown in FIG. 7 steps 12a and 13 (see block 805).

At step 1, the NWDAF 201 determines that the number of UEs registered for the S-NSSAI has fallen below the maximum allowed number, i.e., the S-NSSAI is available again for new UEs. For example, this can happen in in one of the following ways: In step 1a, the OAM 603 may notify the NWDAF 201 that the quota has increased (see messaging 807). In step 1b, the AMFs 207-209 or UDMs 211 may notify the NWDAF 201 about decreased number of [UEs, PDU Sessions] using the S-NSSAIx (see messaging 809). The NWDAF 201 determines that the actual number of [UEs, PDU Sessions] using the S-NSSAI has fallen below the quota/limit.

At step 2a, in the roaming case, the NWDAF 201 notifies all UDMs 211 subscribed to this data analytics about the availability of the S-NSSAIx (see messaging 505). The NWDAF 201 may also send a particular number of available [UEs, PDU Sessions] which can be allowed. For example, the NWDAF 201 can indicate '10' as amount of available [UEs, PDU Sessions] for S-NSSAIx. This would mean to the UDM 211 that ten more UEs 801 can register with the S-NSSAI. The NWDAF 201 can use the service operation Nwdaf_AnalyticsSubscription_Notify (S-NSSAIx, status "available", number of [UEs, PDU Sessions]) to notify the UDM 211 about the availability of the S-NSSAIx and optionally about the number of available [UEs, PDU Sessions]. In step 2b, the UDM 211 sends the notification to the vAMFs 207 (all AMFs in the V-PLMNs) subscribed to this data analytics about the availability of the S-NSSAIx (see messaging 813).

At step 3, in non-roaming case, the NWDAF 201 informs all hAMFs 209 (all AMFs in the H-PLMN) subscribed to this data analytics about the availability of the S-NSSAIx (see messaging 815). Similar to step 2a, the NWDAF 201 may indicate a particular number of available [UEs, PDU Sessions] which can be allowed and can use the same service operation.

At step 4a, the AMFs 207-209 can identify to which UEs rejections have been applied to the exceeded quota for S-NSSAIx. The rejection could have been due to exceeded quota of UEs for the S-NSSAIx. The rejections could have been due to exceeded quota of PDU Sessions for the S-NSSAIx.

The AMF 207-209 may store the status of rejected S-NSSAIs or PDU Sessions sent to the UE in the UE's context in the AMF. Thus, the AMFs 207-209 may determine which UEs 805 can be updated (see blocks 817 and 819), i.e., either (1) to delete the S-NSSAI rejected due to 'quota of UEs exceeded' from the list of rejected S-NSSAIs; or (2) to inform the UE that a PDU Session previously rejected due to 'quota of PDU Sessions exceeded' is now available. The AMFs 207-209 may take into account the subscriber type (e.g., 'gold', 'silver', 'bronze', 'priority services', etc.) of the UE 801 when determining which UEs are to be updated. For example, if the UE 801 is subscribed to priority services (MPS) or mission critical (MC S) services, the AMF may decide to firstly update those UEs by deleting the S-NSSAI from the list of rejected S-NSSAIs.

At step 4b, the AMF may perform a UE Configuration Update (UCU) procedure in order to update the UE 801 (see block 819). One example of UCU procedure is described in 3GPP TS 23.502 clause 4.2.4. The AMF includes a new list of Rejected S-NSSAIs which does NOT include the S-NS-SAI indicated in step 2. At step 5, after the UE 801 is updated, the UE 801 may decide to use the services of the S-NSSAIx. For example, if S-NSSAIx is available for registration, the UE can initiate Registration procedure, e.g., sending a Registration Request message, to register to the S-NSSAI (see messaging 821). As another example, if new PDU Sessions can be established towards the S-NSSAIx, the UE may decide to establish a PDU Session towards the 5-NSSAIx. Where the UE 801 is roaming, it sends a Registration Request message to the vAMF 207 to register to the now available S-NSSAI. Where the UE 801 is in the HPLMN (e.g., not roaming), it sends a Registration Request message to the hAMF 209 to register to the now available S-NSSAI. The procedure 800 ends.

The benefits of this solution are that the UEs can be dynamically updated and allowed to register with the S-NS-SAI or to establish a PDU Session as soon as the S-NSSAI becomes available for new registrations or new PDU Sessions.

Figure 9:
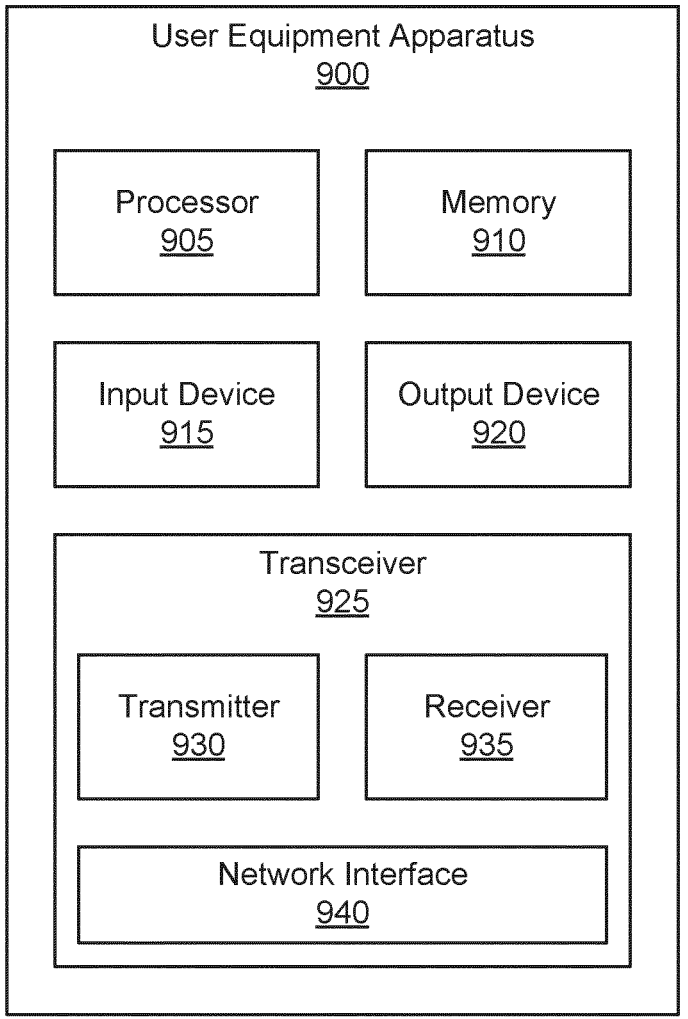
FIG. 9 is a block diagram illustrating one embodiment of a user equipment apparatus.

FIG. 9 depicts one embodiment of a user equipment apparatus 900 that may be used for monitoring a slice attribute of a network slice, according to embodiments of the disclosure. The user equipment apparatus 900 may be one embodiment of the remote unit 105, the roaming UE 203 and/or the non-roaming UE 205. Furthermore, the user equipment apparatus 900 may include a processor 905, a memory 910, an input device 915, an output device 920, a transceiver 925. In some embodiments, the input device 915 and the output device 920 are combined into a single device, such as a touch screen. In certain embodiments, the user equipment apparatus 900 does not include any input device 915 and/or output device 920.

As depicted, the transceiver 925 includes at least one transmitter 930 and at least one receiver 935. Here, the transceiver 925 communicates with a mobile core network (e.g., a 5GC) via an access network. Additionally, the transceiver 925 may support at least one network interface 940. Here, the at least one network interface 940 facilitates communication with an eNB or gNB (e.g., using the "Uu" interface). Additionally, the at least one network interface 940 may include an interface used for communications with an AMF, an SMF, and/or a UPF.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. The processor 905 may control the user equipment apparatus 900 to perform the UE behavior described herein.

In various embodiments, the transceiver 925 may receive a request (e.g., from NWDAF) to report usage data for the network slice. In certain embodiments, the processor 905 may report usage data relating to non-roaming instances of a slice attribute (e.g., number of non-roaming UEs and/or number of non-roaming PDU sessions). In some embodiments, the processor 905 receives (via transceiver 925) a configuration from the NWDAF for monitoring the slice attribute.

In certain embodiments, the processor 905 may receive a subscription request from a NF, such as a UDM and/or NWDAF. Here, the subscription request may indicate a slice attribute or event to monitor. In response to the subscription request, the processor 905 may monitor for and report occurrences of an event relating to the slice attribute. In certain embodiments, the processor 905 may receive (e.g., via transceiver 925) an instruction to perform an enforcement action. For example, if the monitored slice attribute exceeds a quota, then the NWDAF and/or UDM may instruct the user equipment apparatus 900 to perform the enforcement action.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media. In some embodiments, the memory 910 stores data relating to registering with a mobile network through another mobile network, for example storing security contexts, IP addresses, and the like. In certain embodiments, the memory 910 also stores program code and related data, such as an operating system ("OS") or other controller algorithms operating on the user equipment apparatus 900 and one or more software applications.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, may include any known electronically controllable display or display device. The output device 920 may be designed to output visual, audible, and/or haptic signals. In some embodiments, the output device 920 includes an electronic display capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, all or portions of the output device 920 may be located near the input device 915.

As discussed above, the transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver (or portions thereof) at particular times in order to send and receive messages.

The transceiver 925 may include one or more transmitters 930 and one or more receivers 935. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an ASIC, or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
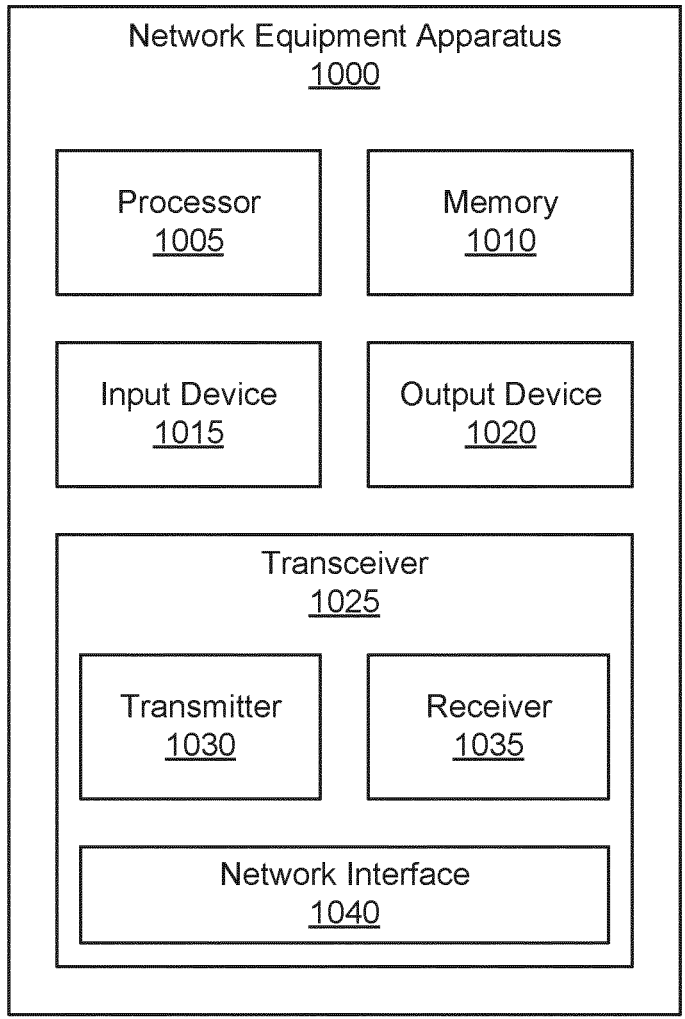
FIG. 10 is a block diagram illustrating one embodiment of a network equipment apparatus.

FIG. 10 depicts one embodiment of a network equipment apparatus 1000 that may be used for monitoring a slice attribute, according to embodiments of the disclosure. The network equipment apparatus 1000 may include a processor 1005, a memory 1010, an input device 1015, an output device 1020, a transceiver 1025. In some embodiments, the input device 1015 and the output device 1020 are combined into a single device, such as a touch screen. In certain embodiments, the network equipment apparatus 1000 does not include any input device 1015 and/or output device 1020.

As depicted, the transceiver 1025 includes at least one transmitter 1030 and at least one receiver 1035. Here, the transceiver 1025 communicates with one or more network functions in the mobile communication network (e.g., PLMN). Additionally, the transceiver 1025 may support at least one network interface 1040. In some embodiments, the transceiver 1025 supports different interfaces for communicating with the various network functions in a mobile core network (e.g., a 5GC).

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the network equipment apparatus 1000 acts as a NWDAF in a PLMN. Here, the processor 1005 determines to collect data for a slice attribute of a network slice. In one embodiment, the slice attribute is the number of UEs using the network slice. In another embodiment, the slice attribute is the number of data sessions (e.g., PDU sessions) using the network slice. In certain embodiments, the processor 1005 determines to collect data for multiple slice attributes of the network slice, for example tracking both the number of UEs using the network slice and the number of PDU sessions using the network slice. In certain embodiments, the processor 1005 determines to collect data for a slice attribute over multiple network slices.

After determining to collect data for at least one slice attribute, the processor 1005 requests (e.g., via transceiver 1025) a first collecting NF to report first usage data for the network slice according to the slice attribute and requests a second collecting NF to report second usage data for the network slice according to the slice attribute. Here, the first usage data may indicate a number of roaming user equipment devices using the network slice and/or a number of data sessions of roaming user equipment devices using the network slice, while the second usage data indicates a number of non-roaming user equipment devices using the network slice and/or a number of data sessions of non-roaming user equipment devices using the network slice. In certain embodiments, the processor 1005 discovers the first and second collecting NFs by sending a discovery request to an NRF, wherein the first and second collecting NFs serve the network slice.

In some embodiments, requesting a first collecting NF to report first usage data for the network slice according to the slice attribute includes sending a configuration for monitoring the slice attribute to the first collecting NF. In certain embodiments, the first collecting NF is a UDM and the second collecting NF is an AMF. In other embodiments, the first collecting NF is an AMF and the second NF function is a UE.

The processor 1005 determines whether a quota associated with the slice attribute is reached using the first usage data and second usage data. In certain embodiments, the request for data analytics indicates multiple quotas for the slice attribute. In such embodiments, the different quotas may indicate different analytics to be sent to the requesting NF.

In response to the determining that a quota is met, the processor 1005 controls the transceiver 1025 to send a notification to a network function, wherein the network function performs an enforcement action. In certain embodiments, the different quotas may implicitly indicate a particular enforcement action to be performed by the requesting NF. In some embodiments, the determining to collect data is triggered by request from a requesting NF (e.g., NEF, UDM, AMF, etc.) for data analytics for at least one quota for a slice attribute of a network slice. In such embodiments, notifying the network function when the quota is met may include notifying the requesting NF.

In certain embodiments, the processor 1005 detects an underrun of the quota associated with the slice attribute and instructs (via transceiver 1025) the network function to cease performing the enforcement action. In some embodiments, the first collecting NF and the second collecting NF are the same NF comprising a NSSF performing a global usage data collection for non-roaming and/or roaming user equipment devices using the network slice.

In various embodiments, the network equipment apparatus 1000 acts as a UDM in a PLMN. Here, the transceiver 1025 receives a configuration for monitoring a slice attribute of a network slice, the slice attribute comprising a number of user equipment devices using the network slice and/or a number of data sessions using the network slice.

In some embodiments, receiving a configuration for monitoring a slice attribute of a network slice comprises receiving a quota for the slice attribute. In certain embodiments, receiving a configuration for monitoring a slice attribute of a network slice comprises receiving multiple quotas for the slice attribute. In such embodiments, each quota may be associated with an enforcement action.

The processor 1005 determines usage data for roaming user equipment devices using the network slice according to the slice attribute, the usage data comprising a number of roaming user equipment devices using the network slice and/or a number of data sessions of roaming user equipment devices using the network slice. Moreover, the processor 1005 may perform an enforcement action in response to determining that an associated quota is reached.

In certain embodiments, determining usage data for roaming user equipment devices using the network slice comprises subscribing to an AMF serving the network slice by requesting the serving AMF to report a current slice attribute for the network slice. In such embodiments, the serving AMF reports the current slice attribute in response to detecting a reporting event, the reporting event being a change in the slice attribute that is at least a predetermined amount since a last report and/or a predetermined amount of time having elapsed since a last report.

The transceiver 1025 reports the usage data for roaming user equipment devices using the network slice to a NWDAF. In some embodiments, the processor 1005 selects a NWDAF capable of collecting data analytics for the slice attribute, wherein the usage data is reported to the selected NWDAF. In some embodiments, the processor 1005 requests the NWDAF to perform data analytics using the slice attribute for the network slice.

In some embodiments, the processor 1005 instructs the serving AMF to perform an enforcement action in response to determining that a quota associated with the slice attribute is met. In such embodiments, the processor 1005 may detect an underrun of the quota associated with the slice attribute and instruct the serving AMF to cease performing the enforcement action.

In various embodiments, the network equipment apparatus 1000 acts as a NF in a PLMN configured to monitor for and report occurrence of an Event. Here, the transceiver 1025 may receive a request (e.g., from NWDAF) to report usage data for the network slice. In certain embodiments, the processor 1005 may collect and report usage data relating to non-roaming instances of a slice attribute (e.g., number of non-roaming UEs and/or number of non-roaming PDU sessions). In other embodiments, the processor 1005 may collect and report usage data relating to roaming instances of the slice attribute (e.g., number of roaming UEs and/or number of roaming PDU sessions). In some embodiments, the processor 1005 receives (via transceiver 1025) a configuration from the NWDAF for monitoring the slice attribute.

In certain embodiments, the processor 1005 may control the transceiver 1025 to request network data analytics for a slice attribute. In certain embodiments, the processor 1005 may receive a subscription request from another NF, such as a UDM and/or NWDAF. Here, the subscription request may indicate a slice attribute or event to monitor. In response to the subscription request, the processor 1005 may monitor for and report occurrences of an event relating to the slice attribute.

In certain embodiments, the processor 1005 may receive (e.g., via transceiver 1025) an instruction to perform an enforcement action. For example, if the monitored slice attribute exceeds a quota, then the NWDAF and/or UDM may instruct the network equipment apparatus 1000 to perform the enforcement action.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media. In some embodiments, the memory 1010 stores data relating to data collection, for example storing quotas, network slice attribute data, enforcement action, monitoring configurations, and the like. In certain embodiments, the memory 1010 also stores program code and related data, such as an operating system ("OS") or other controller algorithms operating on the network equipment apparatus 1000 and one or more software applications.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, may include any known electronically controllable display or display device. The output device 1020 may be designed to output visual, audible, and/or haptic signals. In some embodiments, the output device 1020 includes an electronic display capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, all or portions of the output device 1020 may be located near the input device 1015.

As discussed above, the transceiver 1025 may communicate with one or more remote units and/or with one or more interworking functions that provide access to one or more PLMNs. The transceiver 1025 may also communicate with one or more network functions (e.g., in the mobile core network 140). The transceiver 1025 operates under the control of the processor 1005 to transmit messages, data, and other signals and also to receive messages, data, and other signals. For example, the processor 1005 may selectively activate the transceiver (or portions thereof) at particular times in order to send and receive messages.

The transceiver 1025 may include one or more transmitters 1030 and one or more receivers 1035. In certain embodiments, the one or more transmitters 1030 and/or the one or more receivers 1035 may share transceiver hardware and/or circuitry. For example, the one or more transmitters 1030 and/or the one or more receivers 1035 may share antenna(s), antenna tuner(s), amplifier(s), filter(s), oscillator(s), mixer(s), modulator/demodulator(s), power supply, and the like. In one embodiment, the transceiver 1025 implements multiple logical transceivers using different communication protocols or protocol stacks, while using common physical hardware.

Figure 11:
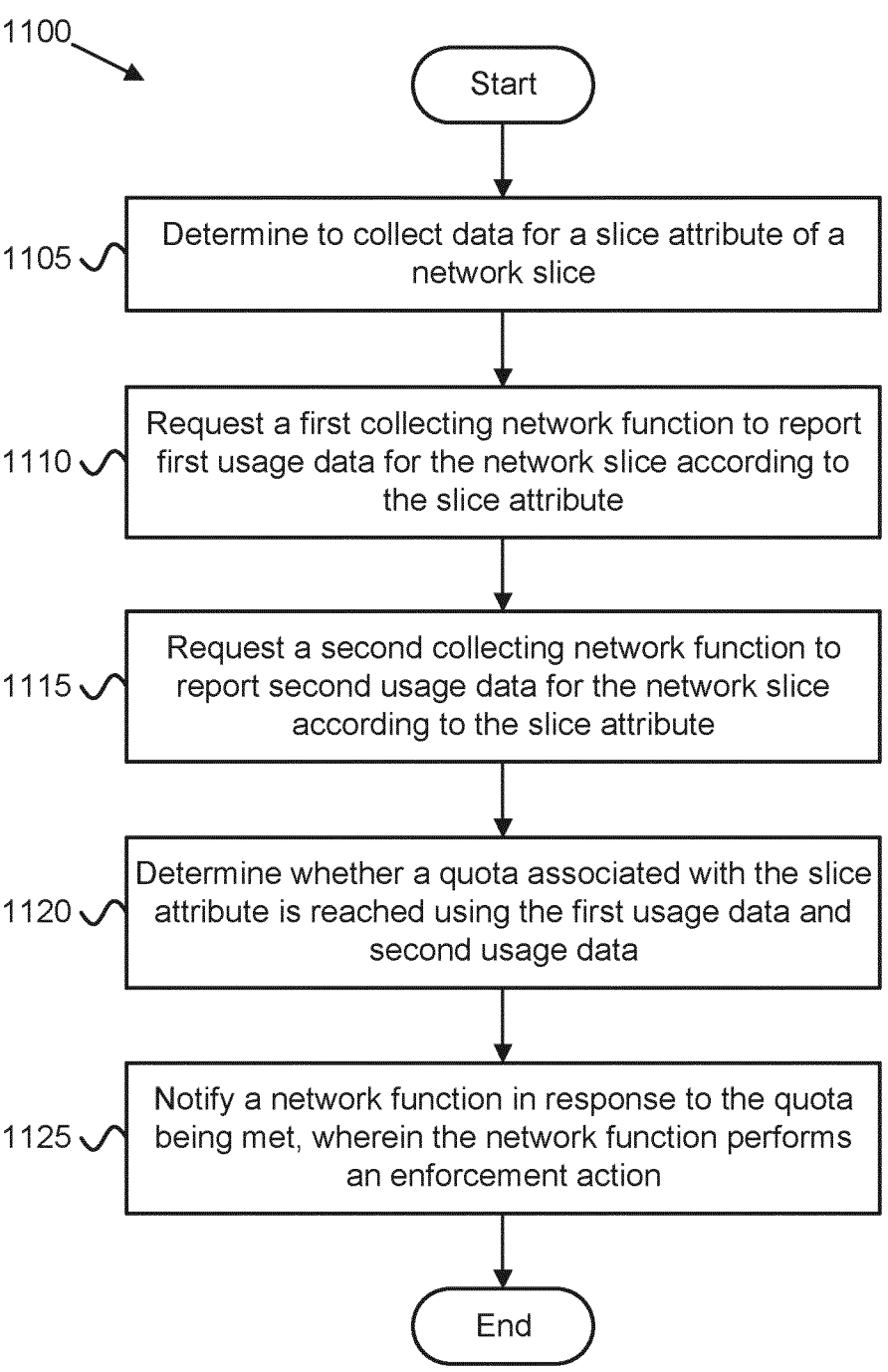
FIG. 11 is a flow chart diagram illustrating one embodiment of a method for monitoring a slice attribute.

FIG. 11 depicts one embodiment of a method 1100 for monitoring a slice attribute, according to embodiments of the disclosure. In various embodiments, the method 1100 is performed by a NWDAF, such as the NWDAF 135, the NWDAF 201, and/or the network equipment apparatus 1000, described above. In some embodiments, the method 1100 is performed by a processor, such as a microcontroller, a microprocessor, a central processing unit (CPU), a graphics processing unit (GPU), an auxiliary processing unit, a FPGA, or the like.

The method 1100 begins and determines 1105 to collect data for a slice attribute of a network slice. Here, the slice attribute is a number of user equipment devices using the network slice and/or a number of data sessions using the network slice. The method 1100 includes requesting 1110 a first collecting network function to report first usage data for the network slice according to the slice attribute. Here, the first usage data indicates a number of roaming user equipment devices using the network slice and/or a number of data sessions of roaming user equipment devices using the network slice. The method 1100 includes requesting 1115 a second collecting network function to report second usage data for the network slice according to the slice attribute. Here, the second usage data indicates a number of non-roaming user equipment devices using the network slice and/or a number of data sessions of non-roaming user equipment devices using the network slice. The method 1100 includes determining 1120 whether a quota associated with the slice attribute is reached using the first usage data and second usage data. The method 1100 includes notifying 1125 a network function when the quota is met, wherein the network function performs an enforcement action. The method 1100 ends.

Figure 12:
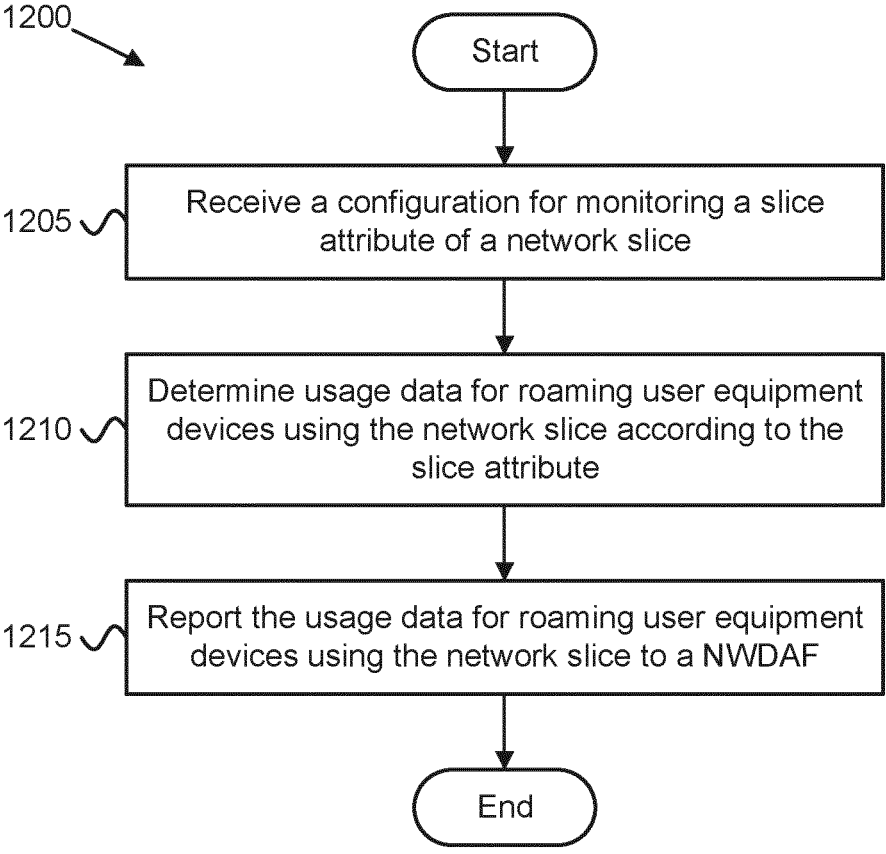
FIG. 12 is a flow chart diagram illustrating another embodiment of a method for monitoring a slice attribute.

FIG. 12 depicts one embodiment of a method 1200 for monitoring a slice attribute, according to embodiments of the disclosure. In various embodiments, the method 1200 is performed by a user-data management function, such as the UDM/UDR 139, the UDM 211, and/or the network equipment apparatus 1000. In some embodiments, the method 1200 is performed by a processor, such as a microcontroller, a microprocessor, a central processing unit (CPU), a graphics processing unit (GPU), an auxiliary processing unit, a FPGA, or the like.

The method 1200 begins and receives 1205 a configuration for monitoring a slice attribute of a network slice, the slice attribute comprising a number of user equipment devices using the network slice and/or a number of data sessions using the network slice. The method 1200 includes determining 1210 usage data for roaming user equipment devices using the network slice according to the slice attribute, the usage data comprising a number of roaming user equipment devices using the network slice and/or a number of data sessions of roaming user equipment devices using the network slice. The method 1200 includes reporting 1215 the usage data for roaming user equipment devices using the network slice to a NWDAF. The method 1200 ends.

Disclosed herein is a first apparatus for monitoring a slice attribute, according to embodiments of the disclosure. The first apparatus may be implemented by a NWDAF, such as the NWDAF 135, the NWDAF 201, and/or the network equipment apparatus 1000. The first apparatus includes a processor that determines to collect data for a slice attribute of a network slice. Here, the slice attribute is a number of user equipment devices using the network slice and/or a number of data sessions using the network slice. The processor requests a first collecting network function to report first usage data for the network slice according to the slice attribute and requests a second collecting network function to report second usage data for the network slice according to the slice attribute. Here, the first usage data indicates a number of roaming user equipment devices using the network slice and/or a number of data sessions of roaming user equipment devices using the network slice, while the second usage data indicates a number of non-roaming user equipment devices using the network slice and/or a number of data sessions of non-roaming user equipment devices using the network slice. The processor determines whether a quota associated with the slice attribute is reached using the first usage data and second usage data. The first apparatus includes a transceiver that sends a notification to a network function in response to the quota being met, wherein the network function performs an enforcement action.

In certain embodiments, the processor discovers the first and second collecting network functions by sending a discovery request to an NRF, wherein the first and second collecting network functions serve the network slice.

In some embodiments, the determining to collect data is triggered by request from a requesting network function (e.g., NEF, UDM, AMF, etc.) for data analytics for at least one quota for a slice attribute of a network slice. In such embodiments, notifying a network function in response to the quota being met may include notifying the requesting network function. In certain embodiments, the request for data analytics indicates multiple quotas for the slice attribute. In such embodiments, the different quotas may indicate different analytics to be sent to the requesting network function. In certain embodiments, the different quotas may implicitly indicate a particular enforcement action to be performed by the requesting network function.

In some embodiments, requesting a first collecting network function to report first usage data for the network slice according to the slice attribute includes sending a configuration for monitoring the slice attribute to the first collecting network function. In certain embodiments, the first collecting network function is a UDM and the second collecting network function is an AMF. In other embodiments, the first collecting network function is an AMF and the second collecting network function is a UE.

In certain embodiments, the processor detects an underrun of the quota associated with the slice attribute and instructing the network function to cease performing the enforcement action. In some embodiments, the first collecting network function and the second collecting network function are the same collecting network function comprising a NSSF performing a global usage data collection for non-roaming and/or roaming user equipment devices using the network slice.

Disclosed herein is a first method for monitoring a slice attribute, according to embodiments of the disclosure. The first method may be performed by a NWDAF, such as the NWDAF 135, the NWDAF 201, and/or the network equipment apparatus 1000. The first method includes determining to collect data for a slice attribute of a network slice. Here, the slice attribute is a number of user equipment devices using the network slice and/or a number of data sessions using the network slice. The method includes requesting a first collecting network function to report first usage data for the network slice according to the slice attribute and requesting a second collecting network function to report second usage data for the network slice according to the slice attribute. Here, the first usage data indicates a number of roaming user equipment devices using the network slice and/or a number of data sessions of roaming user equipment devices using the network slice, while the second usage data indicates a number of non-roaming user equipment devices using the network slice and/or a number of data sessions of non-roaming user equipment devices using the network slice. The method includes determining whether a quota associated with the slice attribute is reached using the first usage data and second usage data and notifying a network function in response to the quota being met, wherein the network function performs an enforcement action.

In certain embodiments, the first method also includes discovering the first and second collecting network functions by sending a discovery request to an NRF, wherein the first and second collecting network functions serve the network slice.

In some embodiments of the first method, the determining to collect data is triggered by request from a requesting network function (e.g., a NEF, UDM, AMF, etc.) for data analytics for at least one quota for a slice attribute of a network slice. In such embodiments, notifying a network function in response to the quota being met may include notifying the requesting network function. In certain embodiments, the request for data analytics indicates multiple quotas for the slice attribute. In such embodiments, the different quotas may indicate different analytics to be sent to the requesting network function. In certain embodiments, the different quotas may implicitly indicate a particular enforcement action to be performed by the requesting network function.

In some embodiments of the first method, requesting a first collecting network function to report first usage data for the network slice according to the slice attribute comprises sending a configuration for monitoring the slice attribute to the first collecting network function.

In some embodiments of the first method, the first collecting network function is a UDM and the second collecting network function is an AMF. In other embodiments of the first method, the first collecting network function is an AMF and the second collecting network function is a UE.

In certain embodiments, the first method also includes detecting an underrun of the quota associated with the slice attribute and instructing the network function to cease performing the enforcement action. In some embodiments of the first method, the first collecting network function and the second collecting network function are the same collecting network function comprising a NSSF performing a global usage data collection for non-roaming and/or roaming user equipment devices using the network slice.

Disclosed herein is a second apparatus for monitoring a slice attribute, according to embodiments of the disclosure. The second apparatus may be implemented by a user-data management function, such as the UDM 139, the UDM 211, and/or the network equipment apparatus 1000. The second apparatus includes a transceiver that receives a configuration for monitoring a slice attribute of a network slice, the slice attribute comprising a number of user equipment devices using the network slice and/or a number of data sessions using the network slice. The second apparatus includes a processor that determines usage data for roaming user equipment devices using the network slice according to the slice attribute, the usage data comprising a number of roaming user equipment devices using the network slice and/or a number of data sessions of roaming user equipment devices using the network slice, wherein the transceiver reports the usage data for roaming user equipment devices using the network slice to a NWDAF.

In some embodiments, receiving a configuration for monitoring a slice attribute of a network slice comprises receiving a quota for the slice attribute. In certain embodiments, receiving a configuration for monitoring a slice attribute of a network slice comprises receiving multiple quotas for the slice attribute. In such embodiments, each quota may be associated with an enforcement action. Moreover, the processor may perform an enforcement action in response to determining that the associated quota is reached.

In certain embodiments, determining usage data for roaming user equipment devices using the network slice comprises subscribing to an AMF serving the network slice by requesting the serving AMF to report a current slice attribute for the network slice. In such embodiments, the serving AMF reports the current slice attribute in response to detecting a reporting event, the reporting event being a change in the slice attribute that is at least a predetermined amount since a last report and/or a predetermined amount of time having elapsed since a last report.

In some embodiments, the processor instructs the serving AMF to perform an enforcement action in response to determining that a quota associated with the slice attribute is met. In such embodiments, the processor may detect an underrun of the quota associated with the slice attribute and instruct the serving AMF to cease performing the enforcement action.

In some embodiments, the processor selects a NWDAF capable of collecting data analytics for the slice attribute, wherein the usage data is reported to the selected NWDAF. In some embodiments, the processor requests the NWDAF to perform data analytics using the slice attribute for the network slice.

Disclosed herein is a second method for monitoring a slice attribute, according to embodiments of the disclosure. The second method may be performed by a user-data management function, such as the UDM 139, the UDM 211, and/or the network equipment apparatus 1000. The second method includes receiving a configuration for monitoring a slice attribute of a network slice, the slice attribute comprising a number of user equipment devices using the network slice and/or a number of data sessions using the network slice. The second method includes determining usage data for roaming user equipment devices using the network slice according to the slice attribute, the usage data comprising a number of roaming user equipment devices using the network slice and/or a number of data sessions of roaming user equipment devices using the network slice. The second method includes reporting the usage data for roaming user equipment devices using the network slice to a NWDAF.

In some embodiments of the second method, receiving a configuration for monitoring a slice attribute of a network slice comprises receiving a quota for the slice attribute. In some embodiments of the second method, receiving a configuration for monitoring a slice attribute of a network slice comprises receiving multiple quotas for the slice attribute. In certain embodiments, each quota is associated with an enforcement action, the method further comprising performing an enforcement action in response to determining that the associated quota is reached.

In some embodiments of the second method, determining usage data for roaming user equipment devices using the network slice includes subscribing to an AMF serving the network slice by requesting the serving AMF to report a current slice attribute for the network slice. In such embodiments, the serving AMF may report the current slice attribute in response to detecting a reporting event. Here, the reporting event being a change in the slice attribute that is at least a predetermined amount since a last report and/or a predetermined amount of time having elapsed since a last report.

In certain embodiments, the second method includes instructing the serving AMF to perform an enforcement action in response to determining that a quota associated with the slice attribute is met. In such embodiments, the second method may also include detecting an underrun of the quota associated with the slice attribute and instructing the serving AMF to cease performing the enforcement action.

In certain embodiments, the second method includes selecting a NWDAF capable of collecting data analytics for the slice attribute, wherein the usage data is reported to the selected NWDAF. In certain embodiments, the second method includes requesting the NWDAF to perform data analytics using the slice attribute for the network slice.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network function comprising:
receiving a first request from an application function (AF) or a network exposure function (NEF), wherein the first request comprises Single Network Slice Selection Assistance Information ("S-NSSAI") that identifies a network slice and an event identifier that indicates a reporting event corresponding to a number of user equipments (UEs) registered to the network slice or a number of data connections established for the network slice, and wherein the first request comprises event reporting information indicating a reporting condition, wherein the reporting condition comprises the number of UEs registered to the network slice or the number of data connections established for the network slice exceeding a respective threshold value or underrunning the respective threshold value by being below the respective threshold value;
transmitting, to the AF or NEF, a confirmation message in response to the first request; and
transmitting a first notification message to the AF or NEF in response to the reporting condition being fulfilled, the first notification message comprising the event identifier and an event report corresponding to the reporting condition, wherein the event report comprises a confirmation that the respective threshold value is exceeded or a confirmation that the respective threshold value is underrun.

2. The method of claim 1, wherein the first request comprises a subscribe request for network slice event exposure.

3. The method of claim 1, wherein the reporting condition comprises a time interval for periodic reporting, wherein the method further comprises determining that the reporting condition is fulfilled based at least in part on determining that the time interval is expired, and wherein the event reporting information contains a current number of UEs registered to the network slice or a current number of data connections established for the network slice.

4. An apparatus comprising:
a memory; and
a processor coupled with the memory and configured to cause the apparatus to:
receive a first request from an application function (AF) or a network exposure function (NEF), wherein the first request comprises Single Network Slice Selection Assistance Information ("S-NSSAI") that identifies a network slice and an event identifier that indicates a reporting event corresponding to a number of user equipments (UEs) registered to the network slice or a number of data connections established for the network slice, and wherein the first request comprises event reporting information indicating a reporting condition, wherein the reporting condition comprises the number of UEs registered to the network slice or the number of data connections established for the network slice satisfying exceeding a respective threshold value or underrunning the respective threshold value by being below the respective threshold value;
transmit, to the AF or NEF, a confirmation message in response to the first request; and transmit a first notification message to the AF or NEF in response to the reporting condition being fulfilled, the first notification message comprising the event identifier and an event report corresponding to the reporting condition, wherein the event report comprises a confirmation that the respective threshold value is exceeded or a confirmation that the respective threshold value is underrun.

5. The apparatus of claim 4, wherein the first request comprises a subscribe request for network slice event exposure.

6. The apparatus of claim 4, wherein the reporting condition comprises a time interval for periodic reporting, wherein the processor is configured to cause the apparatus to determine that the reporting condition is fulfilled based at least in part on determining that the time interval is expired, and wherein the event reporting information contains a current number of UEs registered to the network slice or a current number of data connections established for the network slice.

7. An apparatus comprising a network exposure function (NEF), the apparatus comprising:

a memory; and a processor coupled with the memory and configured to cause the NEF to:

receive, from an application function (AF), a first subscribe request for network slice notification reporting, wherein the first subscribe request comprises Single Network Slice Selection Assistance Information ("S-NSSAI") that identifies a network slice and an event identifier that indicates a reporting event corresponding to a number of user equipments (UEs) registered to the network slice or a number of data connections established for the network slice, and wherein the first subscribe request comprises event reporting information indicating a reporting condition, wherein the reporting condition comprises the number of UEs registered to the network slice or the number of data connections established for the network slice exceeding a respective threshold value or underrunning the respective threshold value by being below the respective threshold value;

discover a network function that supports network slice notification reporting;

transmit a second subscribe request to the network function, the second subscribe request comprising the event identifier and the event reporting information;

receive a first notification message from the network function, the first notification message comprising the event identifier and an event report corresponding to the reporting condition, wherein the event report comprises a confirmation that the respective threshold value is exceeded or a confirmation that the respective threshold value is underrun; and send a second notification message to the AF, the second notification message comprising the event identifier and the event report.

8. The apparatus of claim 7, wherein the second subscribe request comprises the S-NSSAI.

9. The apparatus of claim 7, wherein the first subscribe request comprises a subscribe request for network slice event exposure.

10. The apparatus of claim 7, wherein the reporting condition comprises a time interval for periodic reporting, and wherein the event report contains a current number of UEs registered to the network slice or a current number of data connections established for the network slice.

* * * * *